United States Patent [19]

D'Agostino

[11] Patent Number: 5,231,571
[45] Date of Patent: Jul. 27, 1993

[54] PERSONAL FINANCIAL ASSISTANT COMPUTER METHOD

[75] Inventor: Richard J. D'Agostino, Charlotte, N.C.

[73] Assignee: Personal Financial Assistant, Inc., Charlotte, N.C.

[21] Appl. No.: 567,306

[22] Filed: Aug. 14, 1990

[51] Int. Cl.⁵ ............................................. G06F 15/21
[52] U.S. Cl. ..................................... 364/408; 364/401
[58] Field of Search .................. 364/401, 408; 379/53, 379/90, 93, 96

[56] References Cited

U.S. PATENT DOCUMENTS

| | | | |
|---|---|---|---|
| 3,622,995 | 11/1971 | Dilks et al. | 235/382 |
| 3,876,864 | 4/1975 | Clark et al. | 235/379 |
| 3,949,375 | 4/1976 | Ciarlo | 395/111 |
| 4,071,698 | 1/1978 | Barger, Jr. et al. | 179/2 R |
| 4,186,438 | 1/1980 | Benson et al. | 364/200 |
| 4,330,040 | 11/1981 | Gould et al. | 169/13 |
| 4,346,442 | 8/1982 | Musmanno | 364/408 |
| 4,359,631 | 11/1982 | Lockwood et al. | 235/381 |
| 4,386,266 | 5/1983 | Chesarek | 235/380 |
| 4,581,484 | 4/1986 | Bendig | 179/2 DP |
| 4,648,037 | 3/1987 | Valentino | 364/408 |
| 4,789,907 | 12/1988 | Fischetti et al. | 360/33.1 |
| 4,814,972 | 3/1989 | Winter et al. | 395/200 |
| 4,845,636 | 7/1989 | Walker | 364/479 |
| 4,876,648 | 10/1989 | Lloyd | 364/408 |
| 4,905,186 | 2/1990 | Fukui | 364/406 |
| 4,916,611 | 4/1990 | Doyle, Jr. et al. | 364/401 |
| 4,953,159 | 8/1990 | Hayden et al. | 370/62 |

FOREIGN PATENT DOCUMENTS

2747126 1/1985 United Kingdom ............... 340/717

OTHER PUBLICATIONS

*Database Management*, Everest, 1986, McGraw—Hill Inc., p. 746.
*Encyclopedia of Computer Science and Engineering*, 1983, Van Nostrand Reinhold Company Inc., pp. 563–565.

*Primary Examiner*—Roy N. Envall, Jr.
*Assistant Examiner*—David Huntley
*Attorney, Agent, or Firm*—Bell, Seltzer, Park & Gibson

[57] ABSTRACT

A personal financial assistant computer method includes customer terminals at financial institution branch offices or other locations. Each customer terminal stores financial information for the particular financial services (such as insurance, annuities, bonds, mortgages or loans) sold at that terminal. A display is also provided at each terminal for displaying selected information. At least one representative terminal is provided at a central location and includes a display and keyboard. A telephone link is also provided between the customer terminals and the representative terminals for voice communication. According to the invention, a representative at the representative terminal controls the customer terminal in response to commands initiated from the input device, thereby displaying financial service information at the customer terminal under control of the representative terminal. All display of information at the customer terminal is controlled by the representative in response to one-on-one conversations between the representative and a customer over the telephone line.

5 Claims, 32 Drawing Sheets

WELCOME TO THE PERSONAL FINANCIAL ASSISTANT

Please Consider Selection

A) ANNUITY PROGRAMS             G) SBLI
B) TAX-EXEMPT MUTUAL FUNDS      H) SBLI APPLICATIONS
C) UNIVERSAL LIFE INSURANCE     I) BANK LOANS-MORTGAGE
D) TERM LIFE INSURANCE          J) LOAN APPLICATIONS
E) HOMEOWNERS INSURANCE         K) COMMUNICATIONS
F) INSURANCE APPLICATIONS       L) DISPLAY

F1 Menu Maintenance                F10 Exit To DOS

Friday July 20, 1990

FIG. 9A.

UNIVERSAL LIFE INSURANCE

Please Consider Selection

A) BANKERS PRIME UL

B) BANKERS PRIME PLUS

Press [Esc] Key For Main Menu

▶▶▶ DIRECT ACCESS 4.1 #627304 ▼▼▼

Friday July 20, 1990

FIG. 9B.

Begin with    Input         Illustrate    Chain to    Exit

| General Information |
| Premiums |
| Death Benefit |

```
                    General Information

Client......JOE EXAMPLE              Initial Death Benefit....  100000
Sex (M or F)..................M      Substandard (Y or N)............N
Issue age (0 to 75)..........35      Waiver of mo. deduction.........Y
Smoker (S, N, or P)...........P      Accidental death benefit.$      0
Current interest rate.....8.80%      Child rider (1 to 10 units)...  0
Coverage Option (1 or 2)......1      Agent........MR. AGENT
Change Option in year.........0      Issue state...................NY
Termination age (95 max).....95      Premium mode (A, S, Q, or M)...A
Pour-in Amount..........$     0
```

Use ARROW keys, TAB key, or RETURN key to move between fields.
Press F1 key for context sensitive help for each field.
Use ESCAPE key to abandon changes.  Use F10 key to save changes.

FIG. 9E.

PREMIUM SCHEDULE

| Age | | Age | | Age | | Age | |
|---|---|---|---|---|---|---|---|
| 0 | | 19 | | 38 | 0.00 | 57 | 0.00 |
| 1 | | 20 | | 39 | 0.00 | 58 | 0.00 |
| 2 | | 21 | | 40 | 0.00 | 59 | 0.00 |
| 3 | | 22 | | 41 | 0.00 | 60 | 0.00 |
| 4 | | 23 | | 42 | 0.00 | 61 | 0.00 |
| 5 | | 24 | | 43 | 0.00 | 62 | 0.00 |
| 6 | | 25 | | 44 | 0.00 | 63 | 0.00 |
| 7 | | 26 | | 45 | 0.00 | 64 | 0.00 |
| 8 | | 27 | | 46 | 0.00 | 65 | 0.00 |
| 9 | | 28 | | 47 | | | |
| 10 | | 29 | | 48 | | | |
| 11 | | 30 | | 49 | | | |
| 12 | | 31 | | 50 | | | |
| 13 | | 32 | | 51 | | | |
| 14 | | 33 | | 52 | | | |
| 15 | | 34 | | 53 | | | |
| 16 | 0.00 | 35 | | 54 | | | |
| 17 | 0.00 | 36 | | 55 | | | |
| 18 | 0.00 | 37 | | 56 | | | |

| Age | |
|---|---|
| 76 | 0.00 |
| 77 | 0.00 |
| 78 | 0.00 |
| 79 | 0.00 |
| 80 | 0.00 |
| 81 | 0.00 |
| 82 | 0.00 |
| 83 | 0.00 |
| 84 | 0.00 |

The following premiums are based on the general information and initial face amount entered on the previous screens.

Minimum Premium:      $332.59
Target Premium:     $1,024.59
Max Level Premium:  $1,266.62
Max Single Premium: $15,837.75
M.E.C. Premium:      $3,476.34

Hit any key to remove premium explanation and return to premium input.

FIG. 9G.

PREMIUM SCHEDULE

| Age | | Age | | Age | |
|---|---|---|---|---|---|
| 0 | | 19 | | 38 | 1024.59 | 
| 1 | | 20 | | 39 | 1024.59 |
| 2 | | 21 | | 40 | 1024.59 |
| 3 | | 22 | | 41 | 1024.59 |
| 4 | | 23 | | 42 | 1024.59 |
| 5 | | 24 | | 43 | 1024.59 |
| 6 | | 25 | | 44 | 1024.59 |
| 7 | | 26 | | 45 | 1024.59 |
| 8 | | 27 | | 46 | 1024.59 |
| 9 | | 28 | | 47 | 1024.59 |
| 10 | | 29 | | 48 | 1024.59 |
| 11 | | 30 | | 49 | 1024.59 |
| 12 | | 31 | | 50 | 1024.59 |
| 13 | | 32 | | 51 | 1024.59 |
| 14 | | 33 | | 52 | 1024.59 |
| 15 | | 34 | | 53 | 1024.59 |
| 16 | | 35 | 1024.59 | 54 | 1024.59 |
| 17 | | 36 | 1024.59 | 55 | 1024.59 |
| 18 | | 37 | 1024.59 | 56 | 1024.59 |

| Age | | Age | |
|---|---|---|---|
| 57 | 1024.59 | 76 | 0.00 |
| 58 | 1024.59 | 77 | 0.00 |
| 59 | 1024.59 | 78 | 0.00 |
| 60 | 1024.59 | 79 | 0.00 |
| 61 | 1024.59 | 80 | 0.00 |
| 62 | 1024.59 | 81 | 0.00 |
| 63 | 1024.59 | 82 | 0.00 |
| 64 | 1024.59 | 83 | 0.00 |
| 65 | 0.00 | 84 | 0.00 |
| 66 | 0.00 | 85 | 0.00 |
| 67 | 0.00 | 86 | 0.00 |
| 68 | 0.00 | 87 | 0.00 |
| 69 | 0.00 | 88 | 0.00 |
| 70 | 0.00 | 89 | 0.00 |
| 71 | 0.00 | 90 | 0.00 |
| 72 | 0.00 | 91 | 0.00 |
| 73 | 0.00 | 92 | 0.00 |
| 74 | 0.00 | 93 | 0.00 |
| 75 | 0.00 | 94 | 0.00 |

Type in amount(s). TAB fills next entry. SHIFT-TAB deletes and moves up.
ARROW KEYS move up, down, left, right. ESCAPE abandons. F10 saves. F1 is help.
F2 fills rest. F3 clears all. F4 clears rest. F5 see prems. F6 calc prems.

FIG. 9H.

SPECIFIED AMOUNT SCHEDULE

| Age | | Age | | Age | | Age | |
|---|---|---|---|---|---|---|---|
| 0 | | 19 | | 38 | 100000 | 57 | 100000 |
| 1 | | 20 | | 39 | 100000 | 58 | 100000 |
| 2 | | 21 | | 40 | 100000 | 59 | 100000 |
| 3 | | 22 | | 41 | 100000 | 60 | 100000 |
| 4 | | 23 | | 42 | 100000 | 61 | 100000 |
| 5 | | 24 | | 43 | 100000 | 62 | 100000 |
| 6 | | 25 | | 44 | 100000 | 63 | 100000 |
| 7 | | 26 | | 45 | 100000 | 64 | 100000 |
| 8 | | 27 | | 46 | 100000 | 65 | 100000 |
| 9 | | 28 | | 47 | 100000 | 66 | 100000 |
| 10 | | 29 | | 48 | 100000 | 67 | 100000 |
| 11 | | 30 | | 49 | 100000 | 68 | 100000 |
| 12 | | 31 | | 50 | 100000 | 69 | 100000 |
| 13 | | 32 | | 51 | 100000 | 70 | 100000 |
| 14 | | 33 | | 52 | 100000 | 71 | 100000 |
| 15 | | 34 | | 53 | 100000 | 72 | 100000 |
| 16 | 100000 | 35 | | 54 | 100000 | 73 | 100000 |
| 17 | 100000 | 36 | | 55 | 100000 | 74 | 100000 |
| 18 | 100000 | 37 | | 56 | 100000 | 75 | 100000 |

| Age | |
|---|---|
| 76 | 100000 |
| 77 | 100000 |
| 78 | 100000 |
| 79 | 100000 |
| 80 | 100000 |
| 81 | 100000 |
| 82 | 100000 |
| 83 | 100000 |
| 84 | 100000 |
| 85 | 100000 |
| 86 | 100000 |
| 87 | 100000 |
| 88 | 100000 |
| 89 | 100000 |
| 90 | 100000 |
| 91 | 100000 |
| 92 | 100000 |
| 93 | 100000 |
| 94 | 100000 |

Type in amount(s). TAB fills next entry. SHIFT-TAB deletes and moves up.
ARROW KEYS move up, down, left, right. ESCAPE abandons. F10 saves. F1 is help.
F2 fills rest. F3 clears all. F4 clears rest.

FIG. 9J.

STATEMENT OF POLICY COST AND BENEFIT INFORMATION
BANKERS SECURITY LIFE INSURANCE SOCIETY
EXECUTIVE OFFICE - ARLINGTON, VA / HOME OFFICE - NEW YORK, NY
PRIME PLUS UNIVERSAL LIFE POLICY
FLEXIBLE PREMIUM ADJUSTABLE LIFE INSURANCE

PREPARED FOR: JOE EXAMPLE                INITIAL SPECIFIED AMOUNT: $100,000
MALE, Age 35, PREFERRED NONSMOKER        POUR-IN AMOUNT:                $0
PAYMENT MODE: ANNUAL                     OPTION 1: SPECIFIED AMOUNT PAYABLE
PREPARED BY: MR. AGENT                   AT DEATH INCLUDING THE CASH VALUE

IMPORTANT NOTICE - THE PROJECTED RESULTS OF YOUR INSURANCE PROGRAM MAY CHANGE
WITH VARIATIONS IN THE INTEREST RATES, COST OF INSURANCE RATES, AND THE
FREQUENCY, TIMING AND AMOUNT OF YOUR PREMIUMS AND WITHDRAWALS.

| END OF YR | AGE | ANNUAL PREMIUMS | -- PROJECTED 8.8% INTEREST --<br>FOR TEN YEARS, 9.3% THEREAFTER | | | --- GUARANTEED 4.5% INTEREST --- | | |
|---|---|---|---|---|---|---|---|---|
| | | | CASH VALUE FUND | CASH VALUE | DEATH BENEFIT | CASH VALUE FUND | CASH VALUE | DEATH BENEFIT |
| 1 | 36 | 1,025 | 838 | 0 | 100,000 | 743 | 0 | 100,000 |
| 2 | 37 | 1,025 | 1,752 | 0 | 100,000 | 1,511 | 0 | 100,000 |
| 3 | 38 | 1,025 | 2,743 | 1,023 | 100,000 | 2,303 | 582 | 100,000 |
| 4 | 39 | 1,025 | 3,821 | 2,196 | 100,000 | 3,118 | 1,493 | 100,000 |
| 5 | 40 | 1,025 | 5,000 | 3,491 | 100,000 | 3,958 | 2,448 | 100,000 |

( $5,123 Total: Years 1 - 5 )

| | | | | | | | | |
|---|---|---|---|---|---|---|---|---|
| 6 | 41 | 1,025 | 6,291 | 4,916 | 100,000 | 4,819 | 3,444 | 100,000 |
| 7 | 42 | 1,025 | 7,700 | 6,604 | 100,000 | 5,704 | 4,608 | 100,000 |
| 8 | 43 | 1,025 | 9,232 | 8,428 | 100,000 | 6,612 | 5,808 | 100,000 |
| 9 | 44 | 1,025 | 10,895 | 10,472 | 100,000 | 7,542 | 7,120 | 100,000 |
| 10 | 45 | 1,025 | 12,699 | 12,667 | 100,000 | 8,494 | 8,462 | 100,000 |

( $10,246 Total: Years 1 - 10 )

| | | | | | | | | |
|---|---|---|---|---|---|---|---|---|
| 11 | 46 | 1,025 | 14,754 | 14,754 | 100,000 | 9,493 | 9,493 | 100,000 |
| 12 | 47 | 1,025 | 16,994 | 16,994 | 100,000 | 10,513 | 10,513 | 100,000 |
| 13 | 48 | 1,025 | 19,437 | 19,437 | 100,000 | 11,552 | 11,552 | 100,000 |
| 14 | 49 | 1,025 | 22,103 | 22,103 | 100,000 | 12,610 | 12,610 | 100,000 |
| 15 | 50 | 1,025 | 25,007 | 25,007 | 100,000 | 13,684 | 13,684 | 100,000 |

( $15,369 Total: Years 1 - 15 )

| | | | | | | | | |
|---|---|---|---|---|---|---|---|---|
| 16 | 51 | 1,025 | 28,173 | 28,173 | 100,000 | 14,773 | 14,773 | 100,000 |
| 17 | 52 | 1,025 | 31,623 | 31,623 | 100,000 | 15,868 | 15,868 | 100,000 |
| 18 | 53 | 1,025 | 35,386 | 35,386 | 100,000 | 16,962 | 16,962 | 100,000 |
| 19 | 54 | 1,025 | 39,491 | 39,491 | 100,000 | 18,049 | 18,049 | 100,000 |
| 20 | 55 | 1,025 | 43,971 | 43,971 | 100,000 | 19,121 | 19,121 | 100,000 |

( $20,492 Total: Years 1 - 20 )

| | | | | | | | | |
|---|---|---|---|---|---|---|---|---|
| 30 | 65 | 1,025 | 119,513 | 119,513 | 145,806 | 28,541 | 28,541 | 100,000 |

( $30,738 Total: Years 1 - 30 )

STATEMENT OF POLICY COST AND BENEFIT INFORMATION
BANKERS SECURITY LIFE INSURANCE SOCIETY
EXECUTIVE OFFICE - ARLINGTON, VA / HOME OFFICE - NEW YORK, NY
PRIME PLUS UNIVERSAL LIFE POLICY
FLEXIBLE PREMIUM ADJUSTABLE LIFE INSURANCE

PREPARED FOR: JOE EXAMPLE
MALE, Age 35, PREFERRED NONSMOKER
PAYMENT MODE: ANNUAL
PREPARED BY: MR. AGENT

INITIAL SPECIFIED AMOUNT: $100,000
POUR-IN AMOUNT: $0
OPTION 1: SPECIFIED AMOUNT PAYABLE
AT DEATH INCLUDING THE CASH VALUE

---------- SURRENDER COST / NET PAYMENT INDICES ----------

|  | CURRENT | GUARANTEED |
|---|---|---|
| 10 YEARS: | $0.65/ 10.25 | $3.84/ 10.25 |
| 20 YEARS: | -$2.42/ 10.25 | $4.74/ 10.25 |

AN EXPLANATION OF THE INTENDED USE OF THESE INDICES
IS PROVIDED IN THE LIFE INSURANCE BUYER'S GUIDE.

---------- FOOTNOTES ----------

THIS PROPOSAL ASSUMES AN ANNUAL INTEREST RATE OF 8.8% FOR TEN YEARS AND 9.3% THEREAFTER. INTEREST IS CREDITED MONTHLY TO THE CASH VALUE AFTER DEDUCTION OF EXPENSE AND COST OF INSURANCE CHARGES. CURRENT INTEREST AND COST OF INSURANCE RATES ARE SUBJECT TO CHANGE. POLICY LOAN INTEREST IS 7.4% IN ADVANCE. TO PRESERVE THE TAX TREATMENT OF THE DEATH BENEFIT AS LIFE INSURANCE PROCEEDS AS PROVIDED BY THE INTERNAL REVENUE CODE, PREMIUM PAYMENTS, CASH VALUES AND DEATH BENEFITS MAY BE SUBJECT TO CERTAIN MODIFICATIONS EXPLAINED IN THE POLICY. LEDGER MUST BE ACCOMPANIED BY UL PRIME BROCHURE H-6034.

VALUES ILLUSTRATED ON PREVIOUS PAGE(S) INCLUDE THE FOLLOWING RIDERS:
  WAIVER OF MONTHLY DEDUCTION RIDER.

JULY 20, 1990

PAGE 2

FIG. 9M.

WELCOME TO THE PERSONAL FINANCIAL ASSISTANT

Please Consider Selection

A) ANNUITY PROGRAMS            G) SBLI
B) TAX-EXEMPT MUTUAL FUNDS     H) SBLI APPLICATIONS
C) UNIVERSAL LIFE INSURANCE    I) BANK LOANS-MORTGAGE
D) TERM LIFE INSURANCE         J) LOAN APPLICATIONS
E) HOMEOWNERS INSURANCE        K) COMMUNICATIONS
F) INSURANCE APPLICATIONS      L) DISPLAY

F1 Menu Maintenance            F10 Exit To DOS

============ Friday July 20, 1990 ============

FIG. 9P.

INSURANCE APPLICATIONS

Please Consider Selection

A) ROYAL SPA APP - NY

B) ROYAL FPA APP - NY

C) WILLIAM PENN LIFE APP

D) BANKERS SECURITY

Press [Esc] Key For Main Menu

▶▶▶ DIRECT ACCESS 4.1 #627304 ▼▼▼

Friday July 20, 1990

FIG. 9Q.

```
BANKERS SECURITY APPLICATION    BANKERS SECURITY LIFE INSURANCE    SCREEN 1 of 3

┤ PERSON TO BE INSURED ├─────────────────────────────────────────────────────

First: JOSEPH              MI: A       Last: EXAMPLE
Home Address: 123 MAIN ST              Zip Code: 12345-
City: NEW YORK             State: NY
Date of Birth: 01/01/55    Weight: (190) lbs.  Height:(6) ft.(0 ) in.
Home Phone: (555) 123-4567 Sex: (M) (*) Male ( ) Female
SS# of Insured: 123-45-6789        SS# of Owner: 987-65-4321
Occupation: BRICKLAYER                      Birth Place: NEW YORK, NY
Name of Beneficiary: MARY EXAMPLE
Relationship: SPOUSE

┤ INSURANCE QUESTIONS ├──────────────────────────────────────────────────────

Have you in the last 2 years or do you intend to:
a. Fly as a crew member or pilot?                                  Y/N (N)
b. Auto race, parachute, underwater dive or hang glide?            Y/N (N)
c. Travel or live outside the U.S., excluding military service?    Y/N (N)
```

FIG. 9R.

```
BANKERS SECURITY LIFE INSURANCE

BANKERS SECURITY APPLICATION                           SCREEN 2 of 3

| INSURANCE QUESTIONS |

Plan of Insurance: PRIME PLUS
Insurance Amount:  100,000

Premiums Payable: (3) ( ) 1. Monthly  ( ) 2. Quarterly (*) 3. Annually
                      ( ) 4. Semi-Annually ( ) 5. Premiumatic If available, include Automatic Premium Loan?              Y/N (Y)
Include Accidental Death Benefit?                          Y/N (N)
Include Waiver of Premium?                                 Y/N (Y)
Do you currently have any other Life Insurance?            Y/N (N)

Will the proposed insurance replace or change in whole or in
part any existing insurance or annuities?                  Y/N (N)
Are there any other applications for life or health insurance
pending in this or any other company?                      Y/N (N)
```

FIG. 9S.

BANKERS SECURITY LIFE INSURANCE

BANKERS SECURITY APPLICATION                SCREEN 3 of 3

INSURANCE QUESTIONS

Have you smoked cigarettes during the past 12 months?        Y/N (N)

Have You:
(a) Consulted any physician, been advised to have medical
    treatment or been hospitalized within the past 5 years?  Y/N (Y)
    MEDICAL QUESTIONS Please list the Question number, Illness or nature of injury, Date of
examination and Doctor's full name and address.

(a). 12 A. KNEE SURGERY, 11/5/89, ADAM ZAPPLE, MD 234 PARK RD., NEW YORK, N
(b). .
(c). .
(d). .

FIG. 9T.

```
BANKERS SECURITY APPLICATION    BANKERS SECURITY LIFE INSURANCE    SCREEN 3 of 3

INSURANCE QUESTIONS

Have you smoked cigarettes during the past 12 months?        Y/N (N)
                            ┌─ PRINT APPLICATION ─┐
Have You:
 (a) Consul │ Ready to print your BANKERS SECURITY Application.       Y/N (Y)
     treatm │
 (b) Ever h │      Press any key to begin printing....                Y/N (N)
     disges │
 (c) Ever h └──────────────────────────────────────────┘              Y/N (N)
     of any
 (d) To the best of your knowledge, any physical impairment or        Y/N (N)
     disease?

Application made at: NEW YORK, NY
Entry date (Month & Day) 07/20 (Year) 1990.
```

FIG. 9U.

APPLICATION FOR LIFE INSURANCE TO:
BANKERS SECURITY LIFE INSURANCE SOCIETY
Home Office: 475 Park Avenue South, New York, NY 10016
Executive Office: 4601 Fairfax Drive, P.O. Box 3700, Arlington, VA 22203

1. Applicant's Name (First - Middle - Last)  ☒ Male  ☐ Female
JOSEPH A EXAMPLE

Address (Street, City, State & Zip)  Phone # (555) 123-4567
123 MAIN ST
NEW YORK, NY 12345-

| Birthdate | Birth Place | Soc. Sec. # Insured 123-45-6789 |
|---|---|---|
| 01/01/55 | NEW YORK, NY | Soc. Sec. # Owner 987-65-4321 |
| Height | Weight | Occupation |
| 6 0 | 190 | BRICKLAYER |

5. Plan of Insurance — PRIME PLUS
5a. Amount $100000

6. Supplementary Benefits: ☐ Accidental Death Benefit of $ _____
Waiver of Premium: ☐ Convertible  ☐ Non-Convertible

7. Premiums Payable: ☐ Premiumatic  ☒ Annually  ☐ Quarterly  ☐ Semi-Annually  ☐ Monthly

8. Is Automatic Premium Loan desired if available ☒ Yes ☐ No

9. List ALL life insurance in force on your life. If NONE, so state

| Company | Year Issued | Initial Amount | Waiver of Premium | Accidental Death Benefit Amount |
|---|---|---|---|---|
| NONE | | | | |

2. Name of Beneficiary and Relationship
MARY EXAMPLE, SPOUSE

3. Have you in the last 2 years or do you intend to: Yes No
a. Fly as a crew member or pilot? ............................ ☐ ☒
b. Engage in racing, parachuting, underwater diving or hang gliding? ........................... ☐ ☒
c. Travel or reside outside of the U.S. other than on military assignment? ............... ☐ ☒
(Give details of any "yes" answers.)

4. Do you currently smoke cigarettes or have you smoked any cigarettes during the last 12 months? ............ Yes ☐ No ☒

10. Will the proposed insurance replace or change in whole or in part any existing insurance or annuities? ........ Yes ☐ No ☒
(If yes, give name of company, plan and amount)

11. Are there any other applications for life or health insurance pending in this or any other company? ......... Yes ☐ No ☒
(If "yes", give name of company, plan and amount)

FROM FIG. 9V.

12. Have You:
   a. Consulted any physician, been advised to have medical   Yes  No   c. Ever had high blood pressure, diabetes, cancer or a tumor  Yes  No
      treatment or been hospitalized within the past five years?  ☒  ☐      of any kind? ..........................................................................  ☐  ☒
   b. Ever had a disease of the nervous, genito-urinary or              d. To the best of your knowledge, any physical impairment or
      digestive systems, heart or lungs? ...........................  ☐  ☒         disease? .........................................................................  ☐  ☒
                    (If you answered YES to any of the above questions, give details below)

Question   Illness or Nature                                Doctor's Full Name
      #         of Injury          Date                            and Address
   12 A. KNEE SURGERY, 11/5/89, ADAM ZAPPLE, MD 234 PARK RD, NEW YORK, NY 12345

_____
   _____
   _____

AMENDMENTS, CORRECTIONS AND NOTATIONS MADE BY HOME OFFICE

All statements and answers are complete and true to the best of my/our knowledge and belief. It is agreed that all such statements and answers shall be made a part of any insurance policy issued. Under penalties of perjury, I/we certify: (1) that the Social Security numbers shown in this application are correct; and (2) the IRS has not notified me/us that I/we am/are currently subject to back-up withholding.
I/WE UNDERSTAND AND AGREE: (1) There will be no contract of insurance, until a policy has been issued by the Company and the first premium paid, all during the lifetime and continued good health of the proposed insured. (2) Acceptance of the policy issued on this application shall indicate agreement to any change, correction or addition made by the Company and noted in the space entitled "Amendments, Corrections and Notations made by the Home Office". Change in amount, classification, plan of insurance, age, or benefits requires written consent signed by the Proposed Insured and by the Owner, if other than the Proposed Insured.
ACKNOWLEDGEMENT — I have received and read a copy of the Company's Notices about the Fair Credit Reporting Act, the Medical Information Bureau and the Notice of Information Practices.
Bankers Security Life Insurance Society is authorized to obtain an investigative consumer report on me.

FROM FIG. 9W.

AUTHORIZATION For the Release of Information: To: Any licensed physician, medical practitioner, hospital, clinic or other medically related facility, insurance company or the Medical Information Bureau, Inc. or other organization, institution or person. So that eligibility for life insurance coverage can be determined, I authorize you to give Bankers Security Life Insurance Society and, through it, to its reinsurers and the Medical Information Bureau, any data or records you may have about me or my mental or physical health. This also applies to any child proposed for insurance in the application. This authorization is valid until two and one half years after the effective date of any contract issued in connection with this authorization. A photo of this form will be as valid as the original. (The person who signs this form may have a copy of it upon request.)

Application
made at  NEW YORK, NY
        City and State

Date  07/20          19 90
     (Month & Day)

ORD 84-921   Agent/Witness

Signature of
Proposed Insured _____
Signature of
Owner if other
than Proposed Insured _____
        (If Owner is a firm, corporation or trust, insert name)

By _____
    Signature and title of officer signing for firm, corporation or trust.

FIG. 9X.

```
BANKERS SECURITY APPLICATION    BANKERS SECURITY LIFE INSURANCE    SCREEN 3 of 3

┌─ INSURANCE QUESTIONS ─────────────────────────────────────────────┐
│                                                                   │
│  Have you smoked cigarettes during the past 12 months?   Y/N (N)  │
│                    ┌─ EXIT TO MENU ──────────────────┐            │
│  Have You:         │                                 │            │
│  (a) Consul        │  Ready to exit BANKERS SECURITY Application.  Y/N (N)
│      treatm        │                                 │            │
│  (b) Ever h        │  Press the ENTER key to confirm...   Y/N (N) │
│      disges        │                                 │            │
│  (c) Ever h        └─────────────────────────────────┘   Y/N (N)  │
│      of any                                                       │
│  (d) To the best of your knowledge, any physical impairment or    │
│      disease?                                            Y/N (N)  │
│                                                                   │
│  Application made at:                                             │
│  Entry date (Month & Day) 07/20 (Year) 1990.                      │
└───────────────────────────────────────────────────────────────────┘
```

FIG. 9Y.

PERSONAL FINANCIAL ASSISTANT COMPUTER METHOD

FIELD OF THE INVENTION

This invention relates to computer systems and methods and more particularly to a computer controlled system and method for providing personal financial services.

BACKGROUND OF THE INVENTION

Personal financial services are increasingly required in today's society. As used herein, "personal financial services" include, but are not limited to, the purchase by an individual, of insurance, annuities, stock, bonds or other financial instruments or obtaining a mortgage, consumer or auto loan, credit card or other form of credit for use by the individual, another individual or a business. These services were originally provided on a one-to-one basis by financial institution representatives located at branch offices. Representatives met face-to-face with a customer who desired to purchase, or investigate the purchase of, one or more of these financial services.

The representative and customer typically met face-to-face in an office at a financial institution branch office to discuss the different options available to the customer in terms of the different personal financial services available as well as the different options for each individual financial service. The representative, who was knowledgeable in each of the personal financial services as well as all options for each service, explained the details to the customer and answered any of the customer's questions. Once the customer selected a particular personal financial service and options associated with that service, the representative assisted the customer to complete an application/contract for the desired service containing all of the desired options. The customer either signed the contract and left it with the representative who forwarded the contract to the company's main office, or the customer took the contract with him for further study, signed it at a later time and mailed it to the company's main office.

This process of providing financial services to customers on a one-to-one basis permitted great flexibility, because a representative explained all the details and the customer asked all the questions he desired. The representative provided immediate responses to those questions. This human interaction set the customer's mind at ease. The major disadvantage of this one-to-one interaction was the extremely high labor cost. Each financial institution branch office had to provide a person knowledgeable in all phases of personal financial services which the institution could offer.

The industry has attempted to reduce the labor cost of providing personal financial services by automating the process through the use of computers. For example, a small computer was located at each individual branch office, containing all the necessary forms and rate information relating to personal financial services. A representative of the financial institution would operate the computer to select the desired type of service as well as the various options for the selected service. Unfortunately, the labor cost of providing financial services was only slightly reduced from that of providing on-location representatives without computer automation.

In those situations where a knowledgeable representative was not locally available, "self-service" terminals were designed for operation by the customer. The customer could access personal financial service information and select the desired financial service as well as the desired options for the particular financial service at the self-service terminal. The major disadvantage with this system is the lack of human interaction. There was no one-to-one interaction between a knowledgeable representative and a customer who lacked knowledge in the field. Additionally, many customers were, and still are, uncomfortable with computers or are afraid of using computers.

The personal financial services industry has linked self-service terminals into networks in order to further decrease labor costs. In a network, a central location typically includes a central or host computer which stores rate information, customer databases and other information. Local self-service terminals typically can access information from the central location. It will be understood by those having skill in the art that, as used herein, a "terminal" may be a passive ("dumb") terminal under control of a central computer, an "intelligent" terminal, a personal or desktop computer or a special purpose computer. It will also be understood by those having skill in the art that, as used herein, a local terminal may also be referred to as a remote terminal or customer terminal.

By using networks of self-service terminals, financial services information could be stored in a large central computer. This centralized storage made it easy to maintain the integrity of the information and to update the information. Cost savings were realized, due to maintenance of information at a centralized location.

Several patents for self-service financial service terminal networks have issued. For example, U.S. Pat. No. 4,567,359 to Lockwood discloses a system for automatically dispensing information, goods and services to a customer on a self-service basis. The system includes a central data processing center containing information about the services offered by various institutions in different financial industries. A number of self-service information and sales terminals are located at remote locations and are linked to the central data processing center. The remote terminals are programmed to gather information from customers on the goods and services desired, to transmit information on the desired goods or services from the central data processing center to the customers, to take orders from the customers for the desired goods or services, and to transmit those orders to the central data processing center for processing. The remote or local terminals also accept payment for the goods and services and deliver the goods and services to the customer, in the form of documents, once the orders are complete. The central data processing center is also linked to terminals at various institutions serviced by the system so that each institution can maintain updated information on completed sales by that particular institution.

U.S. Pat. No. 4,831,526 to Luchs et al. provides a computerized insurance premium quote request and policy issuance system. This system processes and prepares applications for insurance and premium quotations and prepares and writes the insurance contracts. The system includes a central processor including a data bank for storing and retrieving data. The data includes information regarding the risk to be insured, client information, insurance premium information and predetermined text data for incorporation into insurance contracts. A number of remote terminals are connected to the central processor to permit the storage and retrieval of data in the memory of the central processor from the terminals. The central processor also has the capability of merging stored data with predetermined text data to compile data embodying a final insurance document. The document is then transmitted to a printer for printing.

These patents exemplify self-service financial service terminal networks which greatly reduce labor cost. However, this reduction in labor cost is at the expense of completely removing the human interface; i.e. one-to-one, face-to-face interaction, between a knowledgeable, financial institution representative and a customer. Human interaction is necessary because the customer is typically not versed in the options available regarding personal financial services. Furthermore, as the number of types of financial services increase and the options available for each individual financial service increase, the customer's lack of awareness increases.

Attempts have been made to make self service terminals "user friendly" to thereby encourage their use. These attempts include simplified keyboards as well as "touch screen" displays. The simplified keyboard may include a few "function" keys and the touch screen display allows the user to touch the desired function on a computer display.

Unfortunately, these attempts to make the terminal "user friendly" have met with only limited success. For example, many individuals are reluctant to use automated teller machines (ATMs), even through ATMs are generally used for relatively simple transactions such as bank deposits, account transfers, and account withdrawals. Personal financial service transactions are an order of magnitude more complex, because they include an unlimited number of types of complex services and an unlimited number of options within each service. As a result, most customers are extremely uncomfortable with using computers to select personal financial services. Customers are also uncomfortable if they have no human guidance in making these selections or answering questions concerning the services.

SUMMARY OF THE INVENTION

It is an object of the present invention to provide a computerized system and method for efficiently providing personal financial services.

It is a further object of the present invention to provide a computerized system and method for efficiently providing personal financial services to customers who may have little knowledge about the financial services available and the options for each.

It is yet a further object of the present invention to provide a computerized system and method for efficiently providing personal financial services, while allowing one-to-one human interaction between a customer and a representative who is knowledgeable about the services.

These and other objects are provided by a personal financial assistant computer system and method which includes remote or local customer terminals at financial institution branch offices or other locations. Each customer terminal stores financial information for the particular financial services sold at that terminal. A display is also provided at each terminal for displaying selected information. At least one central or representative terminal is provided at a central location, which is, or can be, linked to the customer terminals. The representative terminal includes a display and a keyboard or other input device. A telephone link is also provided between the customer terminal and the representative terminal for voice communications.

According to the invention, the representative terminal controls the remote terminals in response to commands initiated from the representative terminal keyboard or input device by the financial institution representative. In other words, the representative operating the central terminal can seize control of a desired customer terminal in response to a verbal customer request over a telephone line, thereby displaying financial service information at the customer terminal under control of the representative terminal. All display of information at the customer terminal is controlled by the representative at the representative terminal in response to the one-to-one conversations the representative has with the customer over the telephone line. This contrasts sharply with the prior art, as exemplified by the above noted patents, in which the remote, self-service terminals control storage and retrieval of data at the central terminal.

In particular, according to the present invention, each customer terminal may include an automatic telephone dialer having multiple preset numbers which are activated by depressing a corresponding button. Each preset number dials a designated representative terminal for the financial services identified by the corresponding button. For example, a customer terminal telephone may have three buttons for "insurance", "annuities", or "stocks", with each button dialing a separate representative terminal.

When a customer selects a desired service at a customer system, causing a connection over a telephone link to a designated office for that service, the representative operating the representative terminal at the other end of the telephone link, will create a corresponding data link between his representative terminal and the customer terminal. The representative terminal then controls the display of information at the customer terminal. The representative verbally discusses the various categories and options available to the customer.

As each option is discussed, the representative will cause the representative terminal to control the display of the customer terminal so that the appropriate options are displayed at the customer terminal. This allows the customer to passively watch the display at the customer terminal, as if he was watching television. The customer need not operate the customer terminal. All displays appearing on the display of the customer terminal may also be concurrently displayed on the display of the representative system.

Eventually, the customer will come to a conclusion as to the category or type of service and options which he desires. Once this point is reached, the representative, who controls the customer terminal, completes a financial service product form which is stored at the customer terminal, using information supplied by the customer over the telephone. The representative may also control the customer terminal to cause the completed form, e.g. application/contract, to be printed for the customer. The representative can also accept payment for the selected financial service by credit card. Alternatively, the customer can mail the application/contract to the financial institution along with his payment or take the financial instrument to a financial institution office and pay for the financial instrument at that office.

The present invention provides many advantages in the delivery of personal financial services. It is not necessary for each financial institution to have a representative at each location who is knowledgeable of all the services provided by that particular financial institution. Instead, the financial institution need only provide a limited number of highly trained representatives at a central location. The central location can be specifically designed to house a number of trained representatives each having a representative terminal.

Moreover, the customer terminal does not act like a computer. It provides human contact with a knowledgeable representative who controls the customer terminal from the representative terminal and talks to the customer over a telephone. The customer need only watch the display screen as he would watch a television screen, while conversing with the representative over the telephone. Thus, the representative controls the display on the screen rather than the customer controlling the display on the screen. As a result, the customer thinks of the remote terminal as more human than machine. In other words, the personal financial assistant computer system puts the human back into high technology.

BRIEF DESCRIPTION OF THE DRAWINGS

A preferred form of the invention is illustrated in the accompanying drawings which.

DESCRIPTION OF A PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
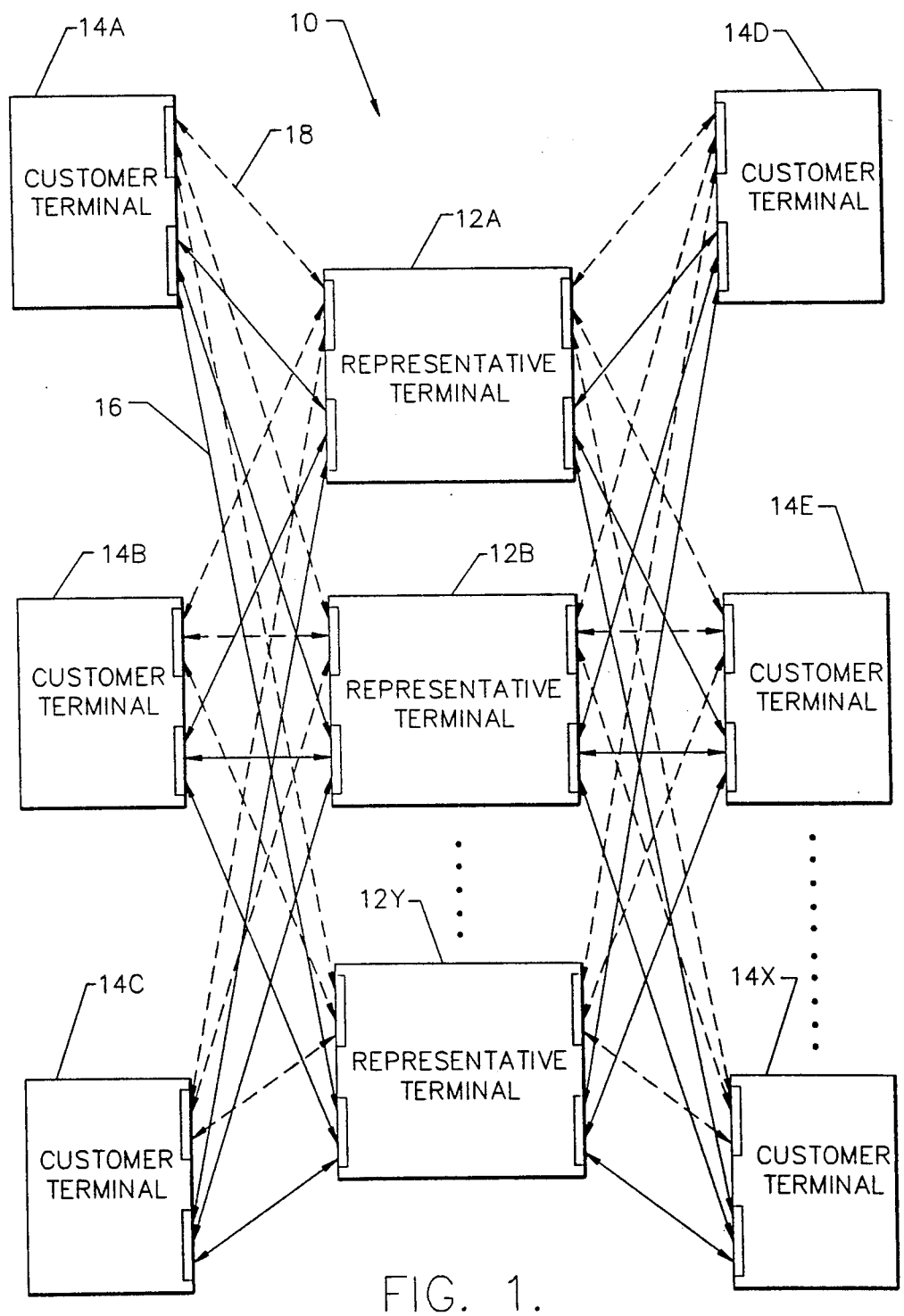
FIG. 1 is a schematic block diagram of a personal financial assistant computer system according to the present invention.

Referring now to FIG. 1, a block diagram of a personal financial assistant computer system according to the present invention will now be described. The personal financial assistant system 10 provides a number of representative terminals 12A ... 12Y located at one or more central locations. The representative terminals may also be referred to as central terminals or host terminals. The central location provides a working environment for financial institution representatives who are knowledgeable in the personal financial services being offered. A number of representatives may be located at a given central location. Each representative may be knowledgeable in one or more of the personal financial services offered.

A plurality of customer terminals 14A ... 14X may be located in financial institution branch offices or other locations including shopping centers, airports, and other publicly accessible facilities. The customer terminals may also be referred to as remote terminals, or, because they are often located in a freestanding booth, as booth terminals.

Still referring to FIG. 1, a number of communication links are provided among terminals 12 and 14. In particular, telephone links (audio or video telephone) 16, shown in solid lines, allow a customer at each customer terminal 14 to establish telephone communications with a representative at a representative terminal 12 for interactive voice and/or video communications. Data links 18, shown in dotted lines, also allow a representative at a representative terminal to control the display of information at a customer terminal 14, using an input device at the representative terminal 12. It will be understood by those having skill in the art, that data links 18 may also be implemented using telephone links.

In operation, a customer approaches a customer terminal, for example customer terminal 14A located in a financial institution branch office or some other public facility. The customer will pick up a phone receiver at the customer terminal and select a desired personal financial service such as "insurance", by depressing an "insurance" button. Depression of the "insurance" button will cause the phone autodialer to dial the phone number to establish phone communications with a representative terminal for insurance, for example representative terminal 12B. A financial institution representative located at representative terminal 12B will receive the phone call from the customer located at customer terminal 14A. The particular financial institution representative who receives the customer's phone call will be knowledgeable in insurance. If one financial institution representative is busy, the incoming customer call may be automatically switched to an available financial institution representative, using techniques well known to those having skill in the art.

The representative answers the incoming customer call, introduces himself and establishes a data link 18 from representative terminal 12B to the customer terminal 14A. The representative, using the keyboard or other input device of his representative terminal 12B, then seizes control of the customer terminal 14A via the data link 18. After seizing control, he may cause a digitized video image of himself to appear on the display of the customer terminal. Once introductions are made over the phone line 16, the financial institution representative will cause a menu to appear on the display of the customer terminal, thereby displaying different categories of personal financial services available to the customer. After discussion, the customer will verbally select a particular service category. In response to this selection, the representative will use his input device to indicate the customer selection on the customer terminal, and will use his input device to step through the available products and options for the selected service category. Once the customer has decided upon the desired product and options, the representative will fill in a computerized financial services product form with the personal and financial service information obtained from the customer.

If the customer desires a hard copy of the completed form, the representative will control the customer terminal, causing it to print the completed form on a printer at the customer terminal. The printed form may be the application/contract for the personal financial service product selected by the customer. The customer may then sign the application/contract and provide payment for the service with a credit card over the phone to the financial institution representative. Alternatively, the customer may take the application/contract with him for later execution and deliver the executed application to the appropriate financial institution branch office, or mail the executed application to the financial institution main office.

The representative terminals 12 can be grouped into regional or district offices. Each regional office can handle one type of personal financial service or many types of services. For example, separate groups of representatives may be located in central offices in the northeast, southeast, midwest, northwest, and southwest regions of the United States. Physical separation of the representatives may provide greater network integrity. If one of the locations becomes inoperable due to uncontrollable circumstances such as a power failure, all incoming customer calls can be transferred to another regional office. Alternatively, one location can handle a single type of financial service for a large geographic area. Furthermore, the representatives may be trained in more than one primary service, so that all customer calls can be handled. Other groupings of representatives and representative terminals may be provided depending upon the range of services covered, the volume of customer calls and other factors.

It will be understood by those skilled in the art that, as shown in FIG. 1, a data link 18 between a representative terminal and customer terminal can be provided separate from the telephone link 16 between the customer terminal and the representative terminal. Alternatively, a single link may be provided for transmission of voice (or video) and data. In practice, the voice and data links will often be implemented using the telephone system. This linking of representative terminals to customer terminals for voice and data communications will be understood by those having skill in the art and therefore, no further description is necessary.

Figure 2A:
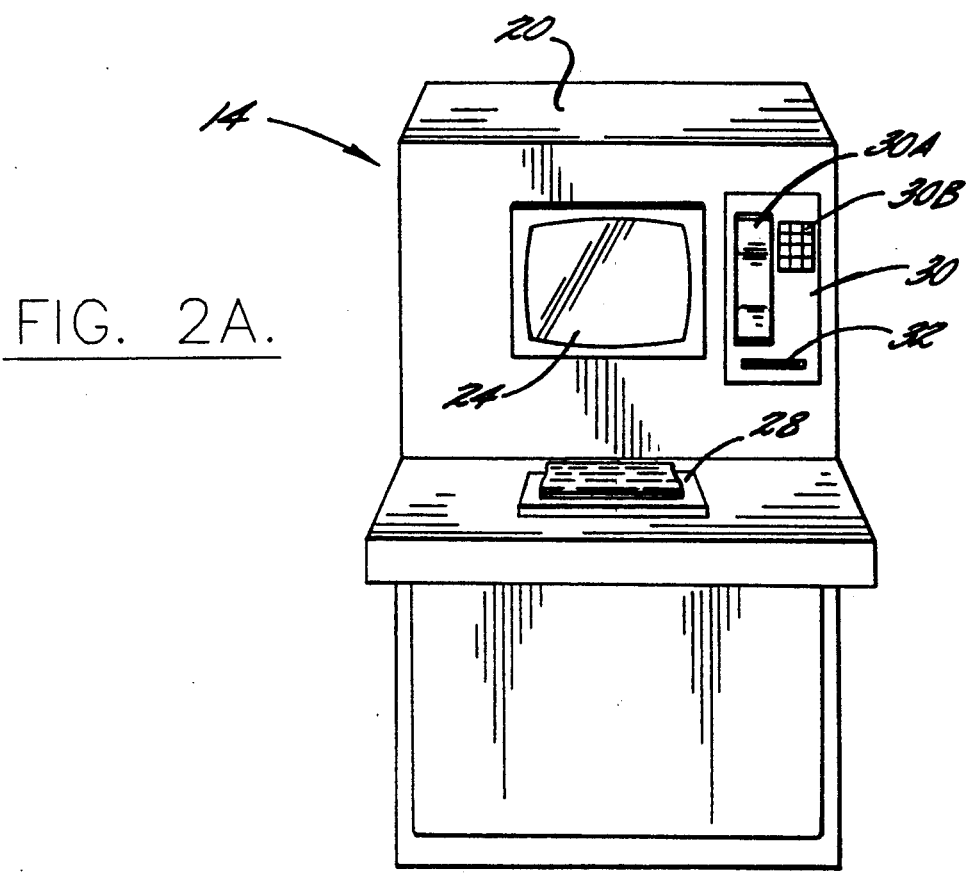
FIG. 2A is a perspective view of a customer terminal which may be used in the system of FIG. 1.
Figure 2B:
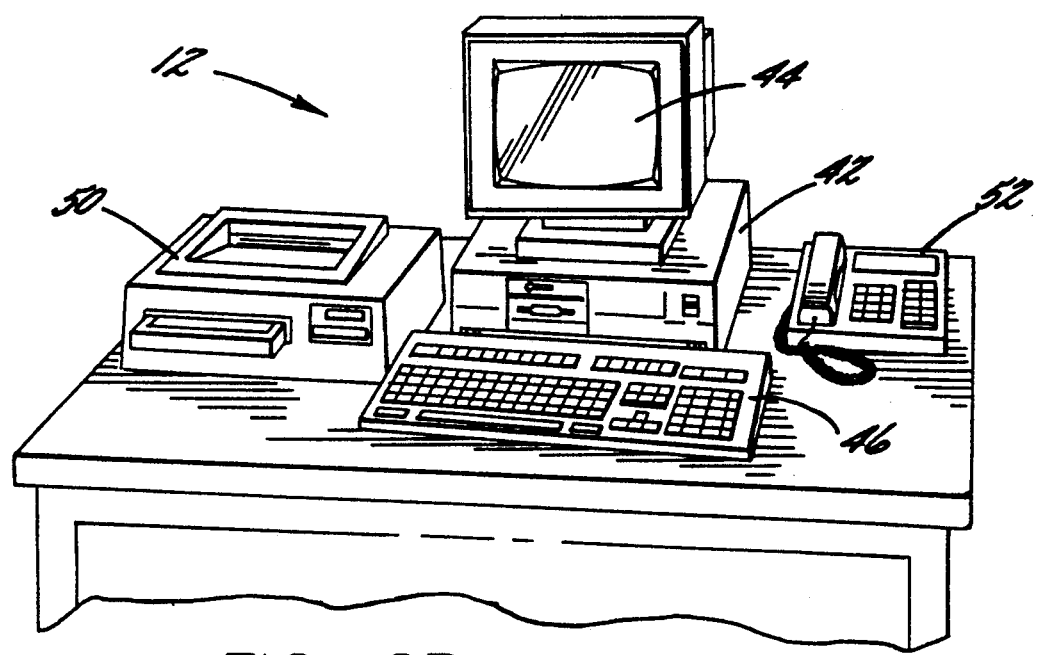
FIG. 2B is a perspective view of a representative terminal which may be used in the system of FIG. 1.

Referring now to FIG. 2A and 2B, a perspective view of the environment of a customer terminal 14 and a representative terminal 12, respectively, are illustrated. In FIG. 2A, the customer terminal 14 may include a housing or booth 20. A display 24, such as a cathode ray tube display, is mounted in the housing 20, for viewing by a customer. A printer 28 is also accessible through the housing 20, permitting printing of financial service product applications/contracts for the customer. A central processing unit, including a disk drive and a modem, is concealed within housing 20 and is generally inaccessible to the customer. A hidden keyboard may also be provided within the housing, for use by service technicians. The keyboard is not used by the customer, because he does not operate the customer terminal.

A telephone 30, which may be mounted in the upper portion of the housing 20, permits a customer to call a financial institution representative located at a central office to discuss personal financial services. Telephone 30, in a preferred embodiment, is an autodialing telephone, so that a customer can simply pick up the receiver 30A and press a key or button 30B which is identified with a particular personal financial service. Phone 30 then automatically dials the appropriate financial institution representative knowledgeable in the financial service identified by the "punched" key 30B on the face plate of telephone 30. A magnetic stripe reader 32 may also be provided, to permit reading of data stored in a magnetic strip media on a credit card.

The central processing unit of the customer terminal may comprise a microcomputer, such as an IBM PS/2 Model 55SX having 2 megabytes of random access memory, and an internal hard disk magnetic storage drive manufactured by International Business Machines Corporation, Boca Raton, Fla. Display 24 may be an IBM 8512 Color Monitor. The modem connected to the central processing unit to permit data communications with representative terminals, may be a Microcom QX/12k Modem manufactured by Microcom, Inc., Danbury, Conn. Printer 28 may be an HP Laser Jet III Printer manufactured by Hewlett-Packard Company, Atlanta, Ga. Telephone 30 may be a DecTel T-100 6 Button Telephone, manufactured by DecTel, Inc., Farmingdale, N.Y. Finally, magnetic strip reader 32 may be an IBM 7312 Magnetic Strip Reader.

It will be understood by those having skill in the art that many other microcomputers may be used for the components of customer terminals 14. Moreover, a microcomputer need not be used. Rather, a single passive ("dumb") display, an "intelligent" display, or a custom designed terminal may be used. However, with the advent of low cost microcomputers, a microcomputer will typically be used.

Referring to FIG. 2B, a financial institution representative terminal 12 is illustrated. Representative terminal 12 typically consists of a central processing unit 42 and a display 44 connected thereto. Additionally, input device 46, for example in the form of a keyboard, is connected to central processing unit 42 permitting entry of customer data and personal financial assistant system commands by the representative.

Referring again to FIG. 2B, a modem (not shown) is also connected to central processing unit 42, to permit data communications between central processing unit 42 of a representative terminal 12 and the central processing unit of a remote terminal 14. Printer 50 is also connected as a peripheral device to the central processing unit 42. It permits printing of various documents by the financial institution representative including financial service product applications/contracts. Finally, telephone 52 is provided at the financial institution representative station permitting voice (or video) communications between a financial institution representative and a customer located at a customer terminal.

The central processing unit 42, display 44, modem and printer 50 may use the same component models described for the customer terminal of FIG. 2A. Telephone 52, preferably a 3100-TJE Telephone manufactured by American Telephone & Telegraph Technologies, Basking Ridge, N.J., may provide a headset in addition to a hand receiver permitting the financial representative to communicate over the phone with a customer in a hands free manner, so the representative is free to operate the keyboard 46. Alternative means for providing hand-free telephone communications includes, but is not limited to, a speaker phone. It will be understood that phone 52 need not be an autodialing phone. However it preferably includes a display which identifies the originating number of an incoming call, so that the appropriate customer terminal can be identified.

Figure 3A:
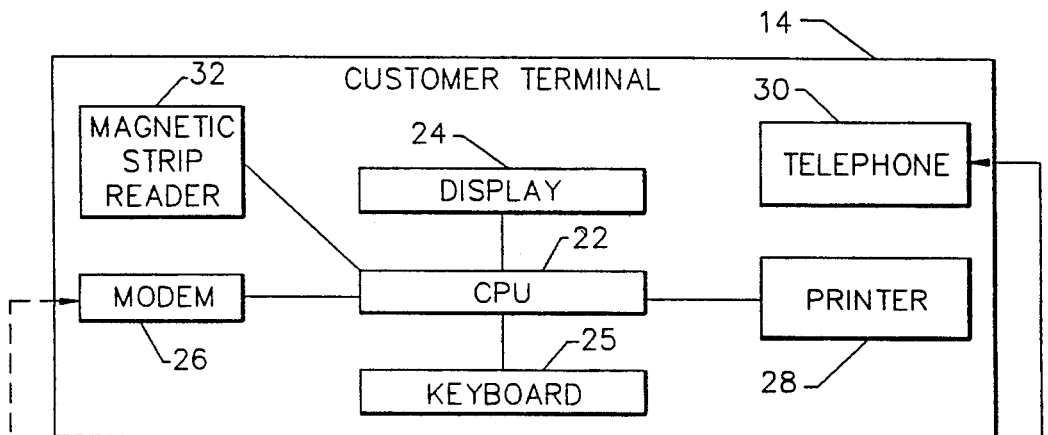
FIG. 3A is a schematic block diagram of the customer terminal hardware.
Figure 3B:
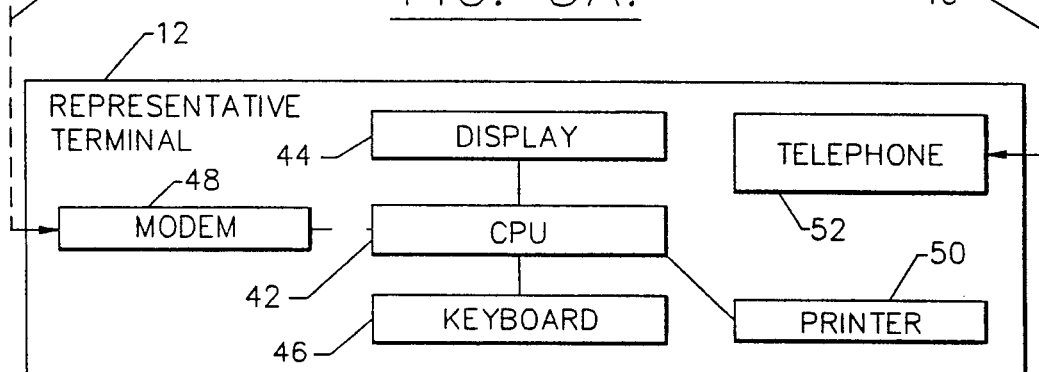
FIG. 3B is a schematic block diagram of the representative terminal hardware.

Referring to FIGS. 3A and 3B, schematic block diagrams of the hardware components of the customer terminal 14 and representative terminal 12 of FIGS. 2A and 2B, respectively, are illustrated. Referring to FIG. 3A, customer terminal 14 contains a central processing unit 22. An input device in the form of keyboard 25 is provided. As previously described, keyboard 25 is hidden in the housing 20 of customer terminal 14. It may be accessed by a technician to permit hardware and software maintenance. Display 24 is connected to the central processing unit 22 permitting display of financial services and options for each financial service for viewing by the customer at the customer terminal.

A number of other peripheral devices are also connected to the central processing unit 22 in the customer terminal 14. Modem 26 permits data communication between processor 22 of the customer terminal and processor 42 of the representative terminal 12. Printer 28 provides an output device for printing financial service product applications/contracts as directed by the financial institution representative via the representative terminal 12. Magnetic strip reader 32 permits entry of personal customer data which may be stored in a magnetic media on a card. Finally, telephone 30 allows a customer to orally communicate with a financial institution representative located at a representative terminal. Telephone 30 is preferably an autodialing telephone whereby a customer simply picks up the receiver and presses the button labelled with the desired personal financial service.

Referring now to FIG. 3B, representative terminal 12 contains a central processing unit 42 which may be in the form of a personal computer, including a display 44 and an input device, i.e. keyboard, 46. Modem 48 permits data communication with customer terminals. Printer 50 allows hard copies to be printed including financial service product applications/contracts. Finally, telephone 52 permits telephone communication with customer terminals. Voice and data communications via the telephone and modem may take place across either a single link, or two links 16 and 18 as shown. Telephone 52, in a preferred embodiment, permits hands free operation to permit oral communications with a customer via the telephone without hindering the financial institution representative's manipulation of keyboard 46.

Figure 4A:
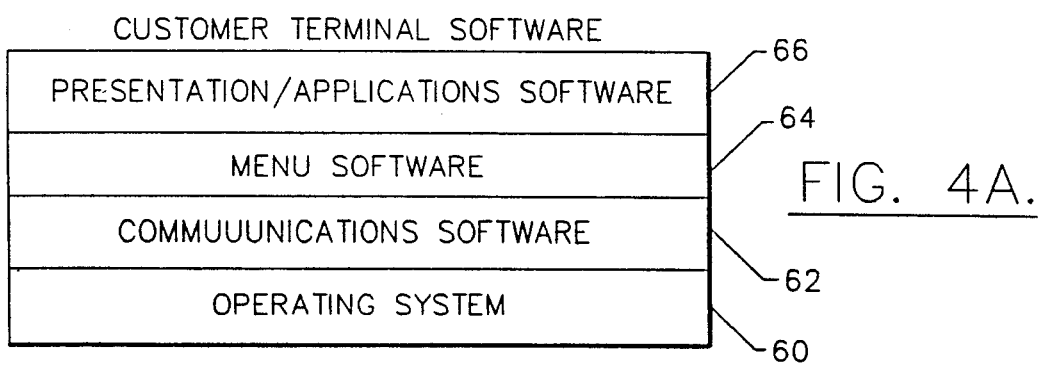
FIG. 4A is a schematic block diagram of the customer terminal software.
Figure 4B:
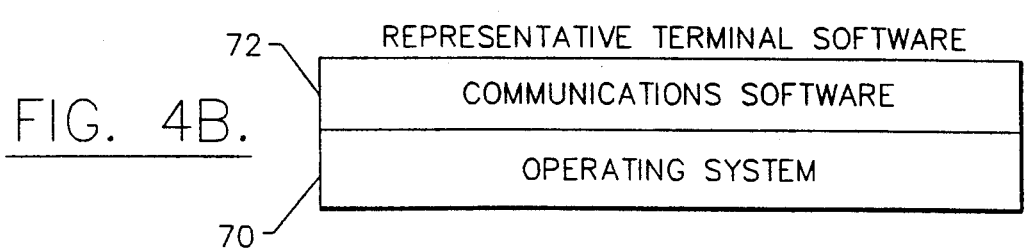
FIG. 4B is a schematic block diagram of the representative terminal software.

Referring now to FIGS. 4A and 4B, a schematic block diagram of the software for both the customer terminal and the representative terminal will now be described. In general, the software of the customer terminal runs on the central processing unit 22 located in the customer terminal 14. Similarly, the software for the representative terminal runs on the central processing unit 42 located in the representative terminal 12. In operation, the financial institution representative controls the remote customer terminal hardware and software using the hardware and software of the representative terminal. This permits the customer at the customer terminal to simply talk to the representative located at the representative terminal over the telephone while viewing the personal financial services information being displayed on display 24. The financial service information displayed on display 24 at the customer terminal is controlled by the financial representative via the keyboard 46 of the representative terminal. In other words, the representative's key strokes are transmitted across the link 18 and control operations of central processing unit 22. Screen images are displayed on display 24 and are also echoed back on link 18 to appear on display 44. It will be understood by those skilled in the art, that data may also be transmitted across the link 18 between the representative terminal and the customer terminal. Control of the customer terminal by the financial representative via the representative terminal permits the customer to simply view the financial information without worrying about operating a financial service computer system.

Referring to FIG. 4A, a schematic block diagram of the customer terminal software is illustrated. At the lowest level, the operating system software 60 is provided. The operating system software is preferably PC-DOS Version 3.30 which is available from International Business Machines Corporation, Boca Raton, Fla. The operating system software, as understood by those having skill in the art, causes the hardware components to operate in combination with one another by accepting input data, processing input data, and producing output data.

Communications software 62 runs on top of the operating system. This software permits the keyboard of the representative terminal to control operation of the customer terminal. Operation of the communication software will be understood by those having skill in the field of computer communications. Communications software 62 is preferably Carbon Copy Version 5.1, available from Microcom, Inc., Danbury, Conn.

Menu software 64, runs on top of communications software 62. The menu software provides a user interface for financial representative operation of the presentation/application software as well as viewing of the financial services information displayed on display 24. Menu software 64 is preferably Direct Access Version 5.0 available from Delta Technology International, Inc., Eau Claire, Wis.

Finally, the presentation and applications software 66 both run on top of menu software 64. The presentation software permits the financial representative to display the financial service products and options for each individual financial service on display 24. This permits the customer to select the desired financial service category and product and all options for the individual financial service product. The presentation software may be written using any high level computer programming language such as Basic, Pascal or C.

Applications software 66 also "runs" on top of menu software 64. Applications software 66 may be custom software which permits the financial representative to enter the customer information as well as the selected financial service product and option information via keyboard 46, resulting in temporary storage of the entered data in the customer terminal central processing unit 22. The applications software also permits the financial representative to cause the customer terminal to print the entered personal customer information and financial service information on printer 28. The printed information appears on a computer stored form. This printed form containing the information may be the application/contract for the selected personal financial service product. The applications software 66 will typically be custom designed for each financial service product, and may be preexisting software used by the financial service provider in stand alone systems.

Referring to FIG. 4B, the schematic block diagram of the representative terminal software is illustrated. Operating system software 70 runs on central processing unit 42 of the representative terminal. Operating system software 70 permits the hardware components of the representative terminal to accept input data, process input data, and produce output data. Similar to operating system software 60, operating system software 70 may also be PC/DOS Version 3.30. Communications software 72 runs on top of operating system software 70. Communications software 72, similar to communications software 62, is preferably Microcom Carbon Copy Version 5.1. Similar to communications software 62, communications software 72 allows the keyboard of the representative terminal to control operation of the customer terminal. Accordingly, a financial representative located at the representative terminal controls the customer terminal by using key strokes which are transmitted across the link between the representative terminal and the customer terminal.

In one embodiment, no applications software is stored in the memory of the representative terminal because all applications software is located in the customer terminal. However, it will be understood by those having skill in the art, that applications software may also be stored in the representative terminal in order to process data at the representative terminal.

The presentation and applications software 66 will now be described in combination with the operational steps for providing financial services via the present invention. A specific example of a particular financial service category and product and particular options for an individual financial service will be used for illustration purposes. It will be understood by those skilled in the art that any personal financial service may be provided using the present invention.

The general sequence of operations for providing financial services using the present invention will now be described in detail with reference to the operational flow charts of FIGS. 5 through 8 and the sample display screens of FIG. 9. The flow charts in FIGS. 5 through 8 provide the flow control resulting from representative indication of the personal financial services and options based on verbal customer selection of the services and options. It will be understood by those having skill in the art that the flow charts may be implemented by the combination of verbal messages between the representative and the customer and operation of the representative and customer terminals by the representative, under stored program control. The displays illustrated in FIG. 9 are examples of displays which appear concurrently on both display 24 and display 44.

In providing personal financial services, several processes can be accomplished. In particular, a detailed proposal comprising specific dollar figures can be presented for a specific category of personal financial services and a specific product within the category. A personal financial service application/contract for a specific personal financial service product within a specific category can be produced. It will be understood by those having skill in the art of providing personal financial services that the general sequence of operations for providing personal financial services is the same regardless of the particular service being provided. For purposes of clarity, "category" or "type" refers to individual personal financial services such as insurance or mortgages and "product" refers to specific products within a specified category or type of personal financial service such as whole life or term insurance, or 15 year or 30 year mortgages.

Figure 5:
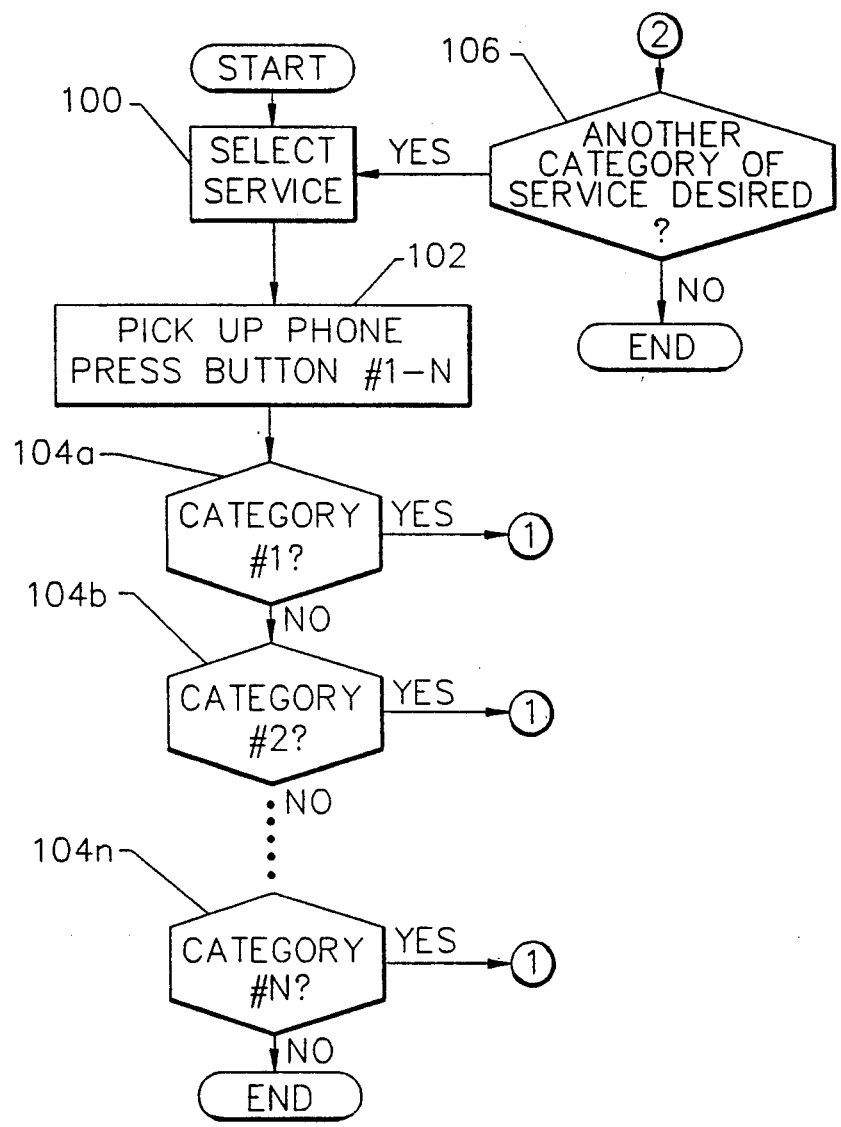
FIGS. 5 through 8 are flow charts illustrating the operation of a personal financial assistant computer system according to the present invention.

Referring to FIG. 5, the sequence of operations for selection of a personal financial service and options associated with a particular personal financial service will now be described. In practice, a customer approaches a customer terminal located in a financial institution branch office or a publicly accessible location such as an airport or shopping center. The customer makes a decision as to which category of financial service he is interested in. Categories of financial services may include insurance, annuities, stocks, bonds or other financial instruments and mortgages, consumer or auto loans, credit cards or other forms of credit. The list of available categories of personal financial services is indicated on the face plate or buttons 30B of the telephone 30 in FIG. 2A. The customer selects which service he or she desires (Block 100). The customer then picks up the receiver of phone 30 and presses the appropriate button on the phone (Block 102).

A determination is made generally at 104 as to which financial service category or type was selected by the customer. This determination process is illustrated generally at 104 as a multiple decision block. In particular, based upon a determination at 104a, 104b through 104n that Category #1, Category #2 through Category #N was selected, respectively, control is transferred to transition Block 1 resulting in further handling of the personal financial service selection process including presentation of proposals for personal financial service products within the selected category and potential production of an application/contract for a particular personal financial service product within the selected category. Based upon a determination generally at 104 that none of the categories of personal financial services was selected, i.e. no button on telephone 30 was pressed, the process for providing personal financial services comes to an end.

Also illustrated in FIG. 5, the customer determines at 106 whether he or she wants to view another category or type of personal financial service. This determination is made as a result of a transfer of control from transition Block 2. As described below, transition Block 2 received control due to a determination at 132 of FIG. 6 that no particular product within the selected category of personal financial service was selected or a determination at 138 of FIG. 6 that the process has proceeded through the presentation of one or more products within a financial service category and a determination is made that no more products within the service category are desired. Based upon a determination by the customer that he or she wants to obtain information about another category of personal financial services, the customer selects the desired category at 100 and indicates the selection at 102 by pressing the appropriate button on the faceplate of telephone 30. If the customer decides that he does not want any information about another category of financial services, he simply hangs up the receiver of telephone 30 and the process of providing personal financial services for this particular customer comes to an end.

Figure 6:
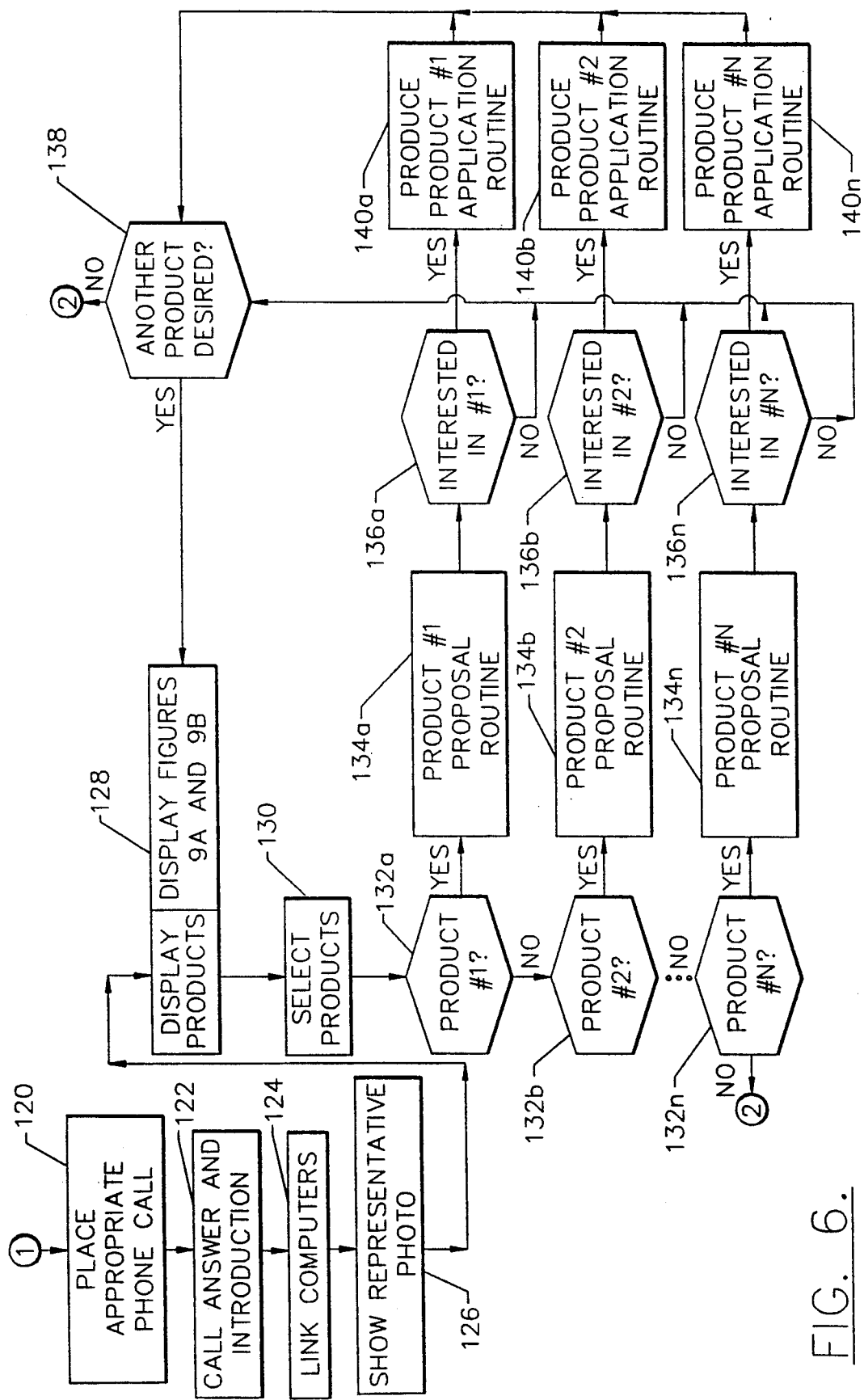

Referring to FIG. 6, the sequence of operations for providing personal financial services once a determination is made as to the category or type of service selected by the customer will now be described. Control is transferred to transition Block 1 as a result of the determination of the category selected. FIG. 6 generally illustrates the sequence of operations performed in selecting a product within any particular category of financial services, presenting a proposal for the selected product, and producing an application for the selected product. However, it will be understood by those having skill in the art that the details of this general process varies depending on the category of personal financial services selected and the product selected within that category.

More specifically, once control is transferred to transition Block 1, as a result of a determination of the category of personal financial services selected generally at 104 (FIG. 5), the telephone call is automatically placed at 120 to the appropriate representative. The appropriate financial institution representative, as previously described, is determined based upon the selected category of personal financial services. The telephone call to this individual is automatically placed as a result of the selection of the personal financial service category by the customer via pressing the appropriate button at 102 located on the face plate of telephone 30. Telephone 30 is an autodialing telephone as previously described which automatically places this telephone call.

Once the telephone call is placed, the financial institution representative located at a representative terminal (see FIGS. 2B and 3B) answers the incoming call via telephone 52 and proceeds to introduce himself over the telephone (Block 122). The introductions may include the institution representative providing the customer with his full name, position within the financial institution company, and the financial institution which he works for. The customer may introduce himself by providing his name and informing the financial institution representative of his interest in obtaining further information concerning products within the selected category of personal financial services. The representative then links his representative terminal to the customer terminal. It will be understood by those having skill in the art that this linking is performed via communications software 62 and communications software 72. Furthermore, as previously described, the communications between the central terminal and the remote terminal as a result of the link, may or may not take place across the same link which connects telephone 30 with telephone 52.

Once the representative has successfully linked the central terminal with the remote customer terminal, he seizes control of the customer terminal causing the customer terminal to display on display 24 his digitized video image (Block 126).

Once the representative's video image has been displayed on display 24 of the customer terminal, the representative will direct the customer terminal to display an initial menu screen containing a list of products within the category selected. The listing of products may require more than one screen display. An example of the products displayed at 128 is illustrated in FIGS. 9A and 9B. The representative will proceed to orally provide a general description of each product displayed in the menu on the display of the customer terminal visible to the customer. The customer will then orally, via the telephone link, select the financial service product he wishes to obtain more information about. The financial representative, based upon the oral selection by the customer, will indicate the selection of the product on keyboard 46 of the representative terminal (Block 130). Each screen display which appears on display 24 of the customer booth system currently appears on display 44 of the representative terminal.

A determination is made generally at 132 as to which financial service product was selected. The selection was made by the representative indicating the product selected by a key stroke on keyboard 46. The key stroke is transferred to the customer terminal. The customer terminal makes this determination as to which product was selected generally at 132. This determination process is illustrated as a multiple decision block in FIG. 6. Based upon a determination as to which product was selected, control is transferred to the appropriate PRODUCT PROPOSAL ROUTINE as indicated generally at 134. The general procedure of presenting the different PRODUCT PROPOSAL ROUTINE(s) is the same. The only difference in the PRODUCT PROPOSAL ROUTINES for the different products selected is that different products have different options. However, the product proposal presentation process is the same in that the options are presented to the customer by the representative by displaying the options on display 24 of the customer terminal (they also appear on display 44 of the representative terminal) and the customer orally selecting an option followed by the representative entering the oral selection of the option via keyboard 46. The selection of options results in control of the customer terminal due to the selected option.

Once the PRODUCT PROPOSAL ROUTINE is complete, the representative asks the customer generally at 136 as to whether he is interested in obtaining an application for the selected product having the selected options. The verbal decision process as to whether or not the customer is interested in an application for the selected product having the selected options is illustrated by a multiple decision block generally at 136. More specifically, if Product #1 was selected, a Verbal determination is made at 136a to whether the customer is interested in obtaining an application for Product #1 having the selected options. If Product #2 was selected, a verbal determination is made at 136b as to whether the customer desires an application for Product #2 having the selected options. Finally, if Product #N was selected, a Verbal determination is made at 136n as to whether the customer desires an application for financial Product #N having the selected options.

Based upon a verbal determination generally at 136 that an application for the particular product having the selected options is not desired, control is transferred to 138 to determine whether or not the customer desires to obtain information for another product. Based upon a determination at 138 that the customer orally indicated a desire to obtain information about another product, the representative causes the customer terminal to display products, at Block 128, an example of which is illustrated in FIGS. 9A and 9B. If it is determined at 138, that the customer does not desire to obtain information concerning any other products, the representative determines, at 106 of FIG. 5, whether the customer desires to obtain information concerning a different category of personal financial services.

If it is determined generally at 136 that the customer is interested in obtaining an application for the particular product having the selected options, the operational flow moves to PRODUCE PRODUCT #1-N APPLICATION ROUTINE (Block 140). Specifically, if the customer is interested in obtaining the application for Product #1 having the selected options, the operational flow moves to PRODUCE PRODUCT #1 APPLICATION ROUTINE at 140a. If it is determined at 136b that the customer is interested in obtaining an application for Product #2 having the selected options, the operational flow moves to PRODUCE PRODUCT #2 APPLICATION ROUTINE at 140b. Similarly, if it is determined at 136n that the customer is interested in obtaining an application for Product #N having the selected options, the operational flow moves to PRODUCE PRODUCT #N APPLICATION ROUTINE at 140n.

Once the PRODUCE PRODUCT APPLICATION ROUTINE is complete, a Verbal determination is made at 138 as to whether a customer desires to obtain information about another product. This determination is made as a result of an interest expressed by the customer via the telephone link resulting in an appropriate key stroke on keyboard 46 by the financial institution representative at the central terminal. If the customer desires to obtain information about another product, the operational flow moves to Block 128 resulting in display of the products within the same financial service category, an example of which is illustrated in FIGS. 9A and 9B. If the customer does not wish to obtain information concerning other products within the same financial service category, the representative makes the appropriate indication, and the customer makes a determination as to whether he or she desires to obtain information about a different category of financial services.

Figure 7:
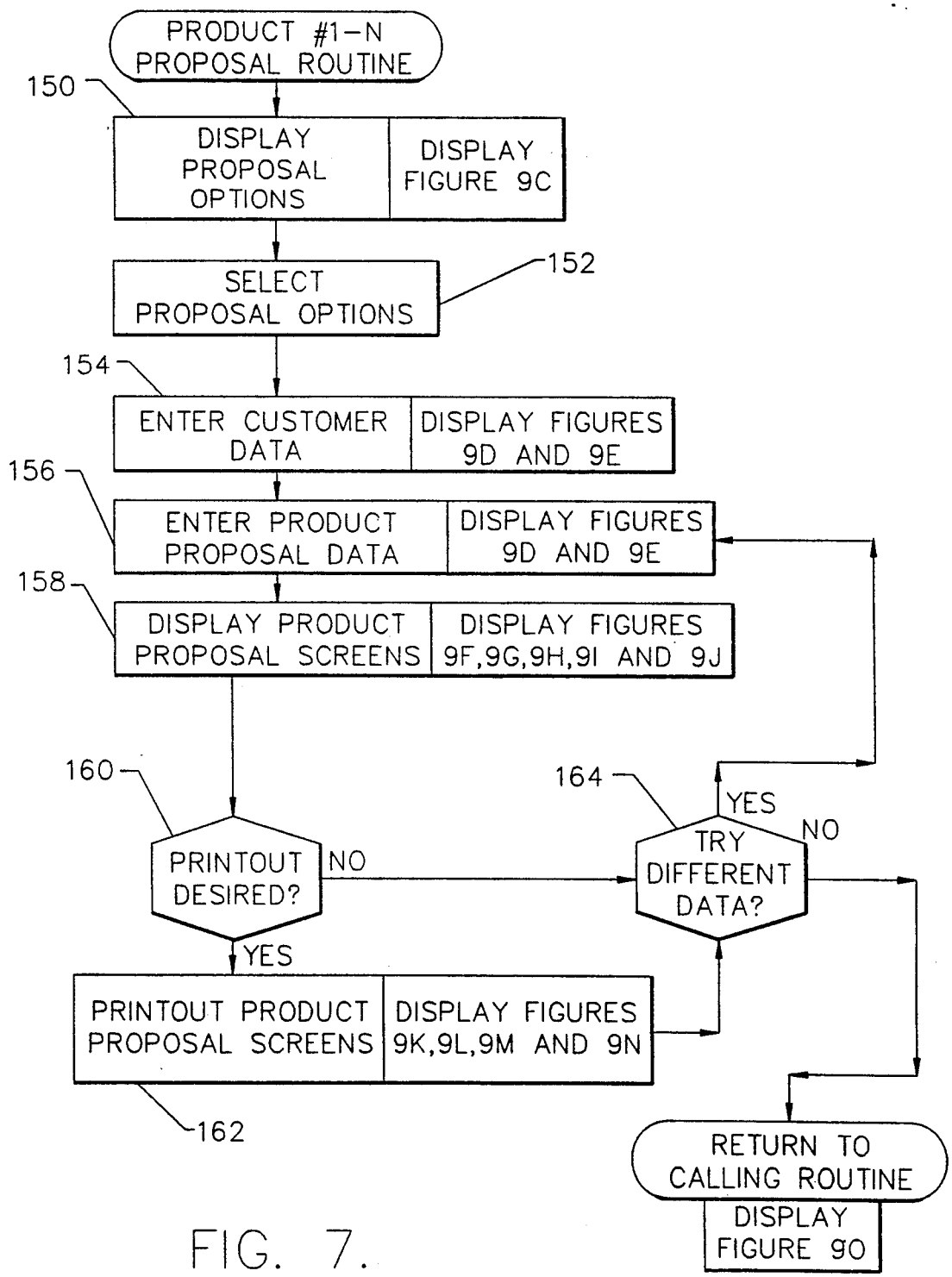
Figure 9C:
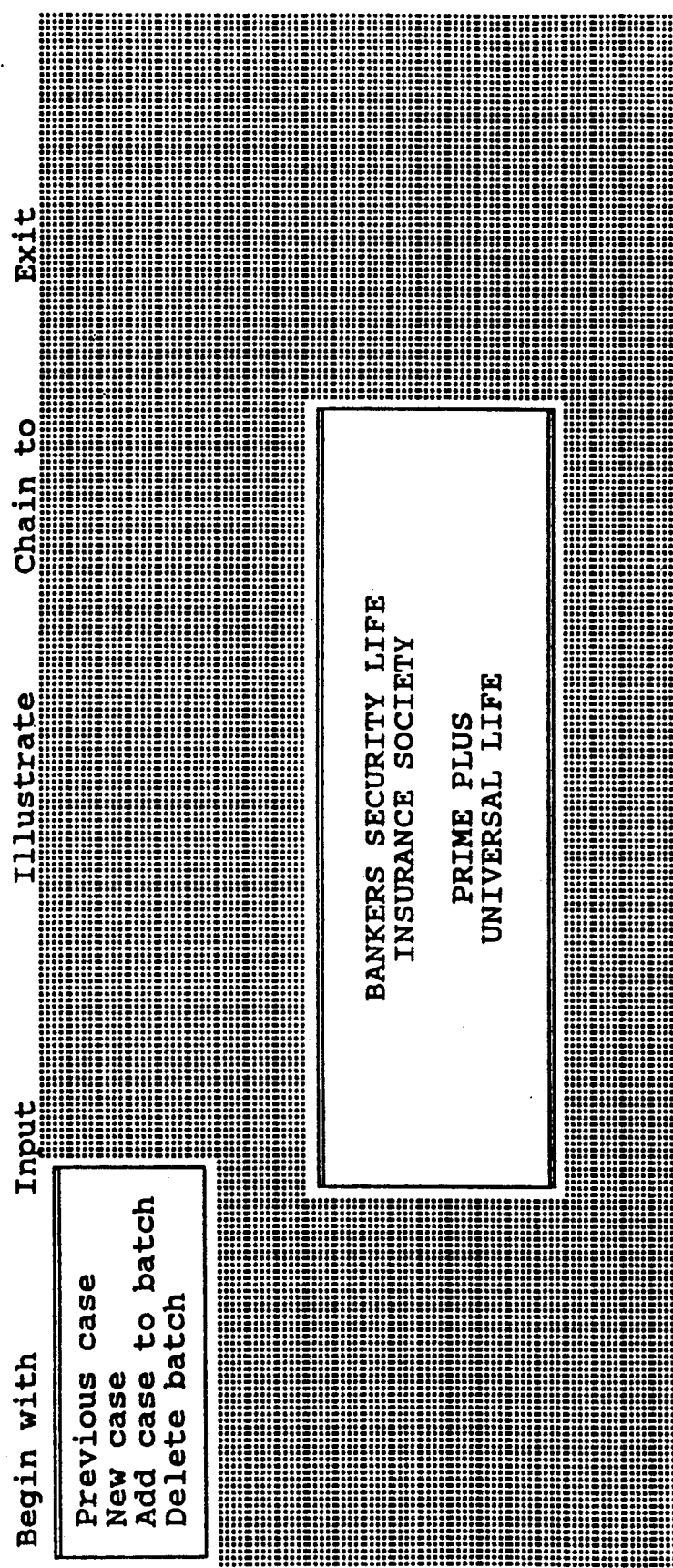
FIGS. 9A through 9Y illustrate display screens which may be displayed at the customer terminal and representative terminal during the operations of FIGS. 5 through 8.

Referring to FIG. 7, the sequence of operations for presenting the options, i.e. product proposal, for the selected product will now be described. Control is received by PRODUCT #1-N PROPOSAL ROUTINE as a result of a determination generally at 132 of FIG. 6 as to which product was selected. It will be understood that the presentation of the product proposal will be similar regardless of the product selected, the only difference being that different options are available for different products. Thus, the general sequence of operations for presenting the product proposal as illustrated in FIG. 7 is the same and will now be described. In order to clarify the description of the presentation provided by the PRODUCT PROPOSAL ROUTINE, a specific example providing screen displays as illustrated in FIGS. 9C through 9W will be presented.

Based upon a verbal determination generally at 132 as to the product selected by the customer and indicated by the representative via keyboard 46, the product proposal options are displayed at 150 on display 24. The same screen is displayed concurrently on display 44. An example of the product proposal options is illustrated in FIG. 9C. In terms of a specific example, assume the customer verbally selected the Universal Life Insurance product displayed in FIG. 9A. As a result of this selection, the operator enters the selection on keyboard 46. The entry of this option controls the customer terminal, causing display of the screen illustrated in FIG. 9B on display 24.

The customer then verbally selects the Banker's Prime Plus product and the representative enters this selection on keyboard 46 of the representative terminal. This entry results in display of FIG. 9C at 150 on display 24 of the customer terminal. The customer has the option of viewing a previous case, preparing a new case, adding a case to batch, or deleting a case from batch. In the preferred embodiment, no cases are stored and therefore viewing a previous case, adding a case to batch and deleting a case from batch are not implemented. However, it will be understood that the present invention can be modified to permit storage of data in the customer terminal, the representative terminal or both, to allow for these options. In the preferred embodiment, the representative selects the new case option for the Bankers Prime Plus product. The product selection may contain more or fewer screens dependent upon the individual product.

Figure 9D:
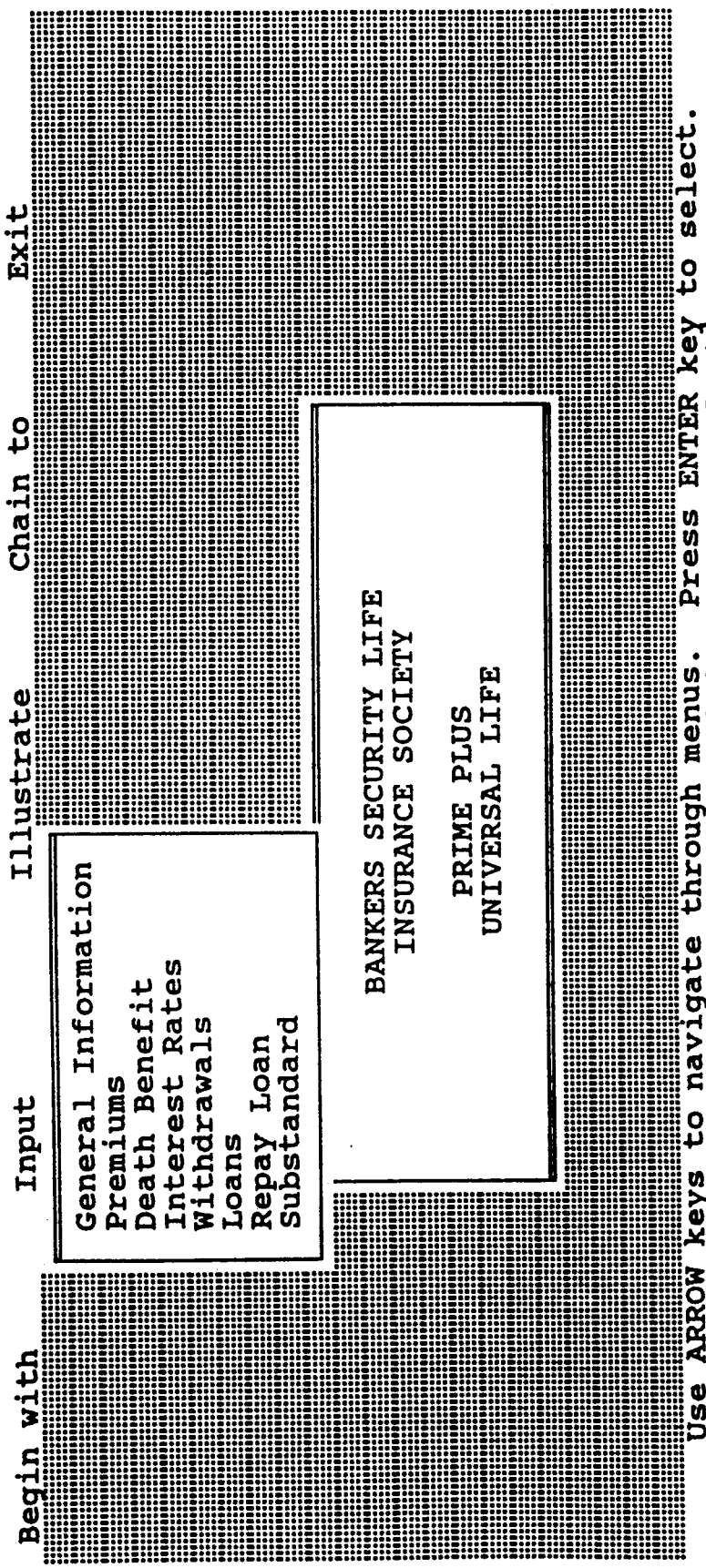

The representative then obtains personal customer data and product proposal data from the customer via the telephone link for the new case option selected at 152. The entry of the customer data and product proposal data is carried out at Blocks 154 and 156. More specifically, the representative selects the General Information option of input as illustrated in FIG. 9D in order to enter the appropriate data. The selection of the General Information option for input results in display of a screen containing personal customer and product proposal data, an example of which is illustrated in FIG. 9E. The financial institution representative asks the customer via the telephone for the information displayed in FIG. 9E.

As a result of the verbal answer to the queries, the representative enters the data via keyboard 46 at the representative terminal which is transmitted via the link from the representative terminal to the customer terminal causing the information to appear on the display 24 at the customer terminal, an example of which is illustrated in FIG. 9E. The information also appears on display 44 at the representative terminal. Once all the personal customer and product proposal data is obtained and entered by the representative, the representative controls the customer terminal via the representative terminal, causing the proposal for the product to be displayed concurrently on display 24 and display 44 (Block 158).

Figure 9F:
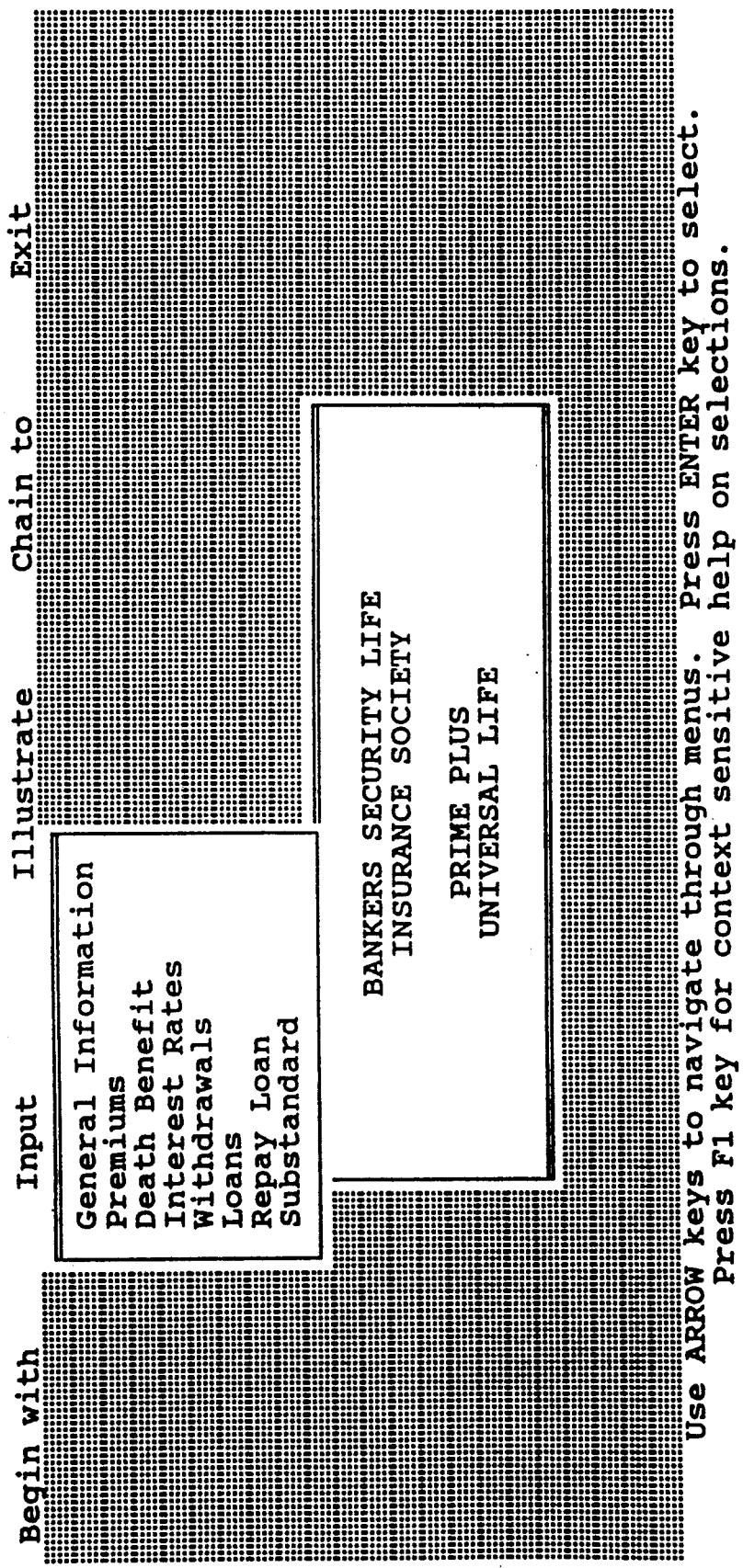
Figure 9I:
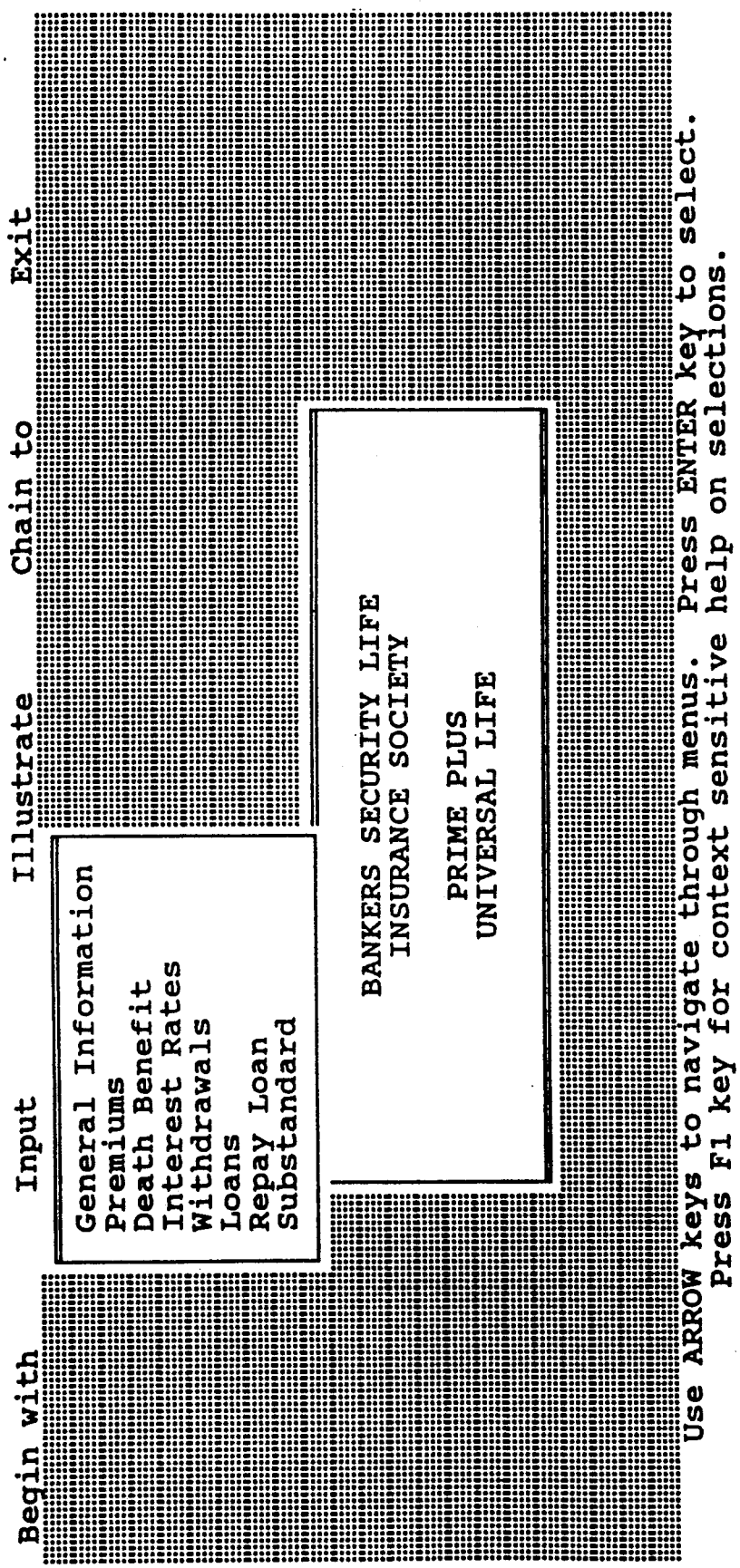

Examples of the product proposal screens displayed at 158 are illustrated in FIGS. 9F, 9G, 9H, 9I and 9J. The process of displaying these product proposal screens is illustrated by way of example. Continuing from the previous example of the Bankers Prime Plus product for Universal Life Insurance, once the general information has been obtained, the representative can display the premiums for the Bankers Prime Plus Universal Life Insurance product by selecting the premium option as illustrated in FIG. 9F. This results in the display of FIG. 9G containing the premium schedule and premium explanation in a smaller window on display 24. Display of the premium explanation is removed and the premium amounts for each month are displayed in FIG. 9H. Once the premium amounts have been entered by the representative, the representative can return to the display illustrated in FIG. 9D to select another option. The same display is illustrated in FIG. 9I wherein the representative selects another input option, for example, Death Benefit. This results in a display of the product proposal for death benefits for Bankers Plus Universal Life Insurance, an example which is illustrated in FIG. 9J.

It will be understood by those having skill in the art that the rest of the input options can be sequenced in order to enter all of the premium amounts and option amounts for the selected product. The options and amounts will vary depending upon the product selected. The number of screen displays and key entries by the representative will vary depending on the category and product selected.

Once all of the product proposal screens have been displayed and the information concerning premiums and the like has been entered, the representative asks the customer whether he desires a printout of the product proposal screens. Based upon a determination at 160 that the customer does not desire a printout of the product proposal screens, a verbal determination is made at 164 whether the customer desires to select different data resulting in variance in the premium and amounts. If the customer desires different product proposal data, the customer selects the data and the representative enters the data at Block 156. Based upon a verbal determination at 164 that the customer does not desire different product proposal data, control is returned to the calling routine, i.e. Block 136 of FIG. 6. This also results in the display of FIG. 9O.

If it is determined at 160 that the customer desires a printout of the product proposal screens, these screens are printed at 162. The printing is accomplished by the representative entering a print command for each product proposal screen at keyboard 46 of the representative terminal. The entry of the print command is transmitted across the link and causes the central processing unit 22 of the customer terminal to print the product proposal screen displayed on display 24 on printer 28. One or more of the product proposal screens can be printed. It is not necessary, however, to print all of the product proposal screens.

Once the desired product proposal screens have been printed, the representative asks the customer whether other product proposal data may be desired to calculate product proposals. Based upon a verbal determination at 164 that the customer desires that different product proposal data be used, the representative enters different product proposal data at 156. If it is verbally determined at 164 that the customer does not desire that different product proposal data be used, control is returned to the calling routine resulting in a verbal determination at Block 136 of FIG. 6, whether the customer is interested in obtaining a product application.

Figure 9K:
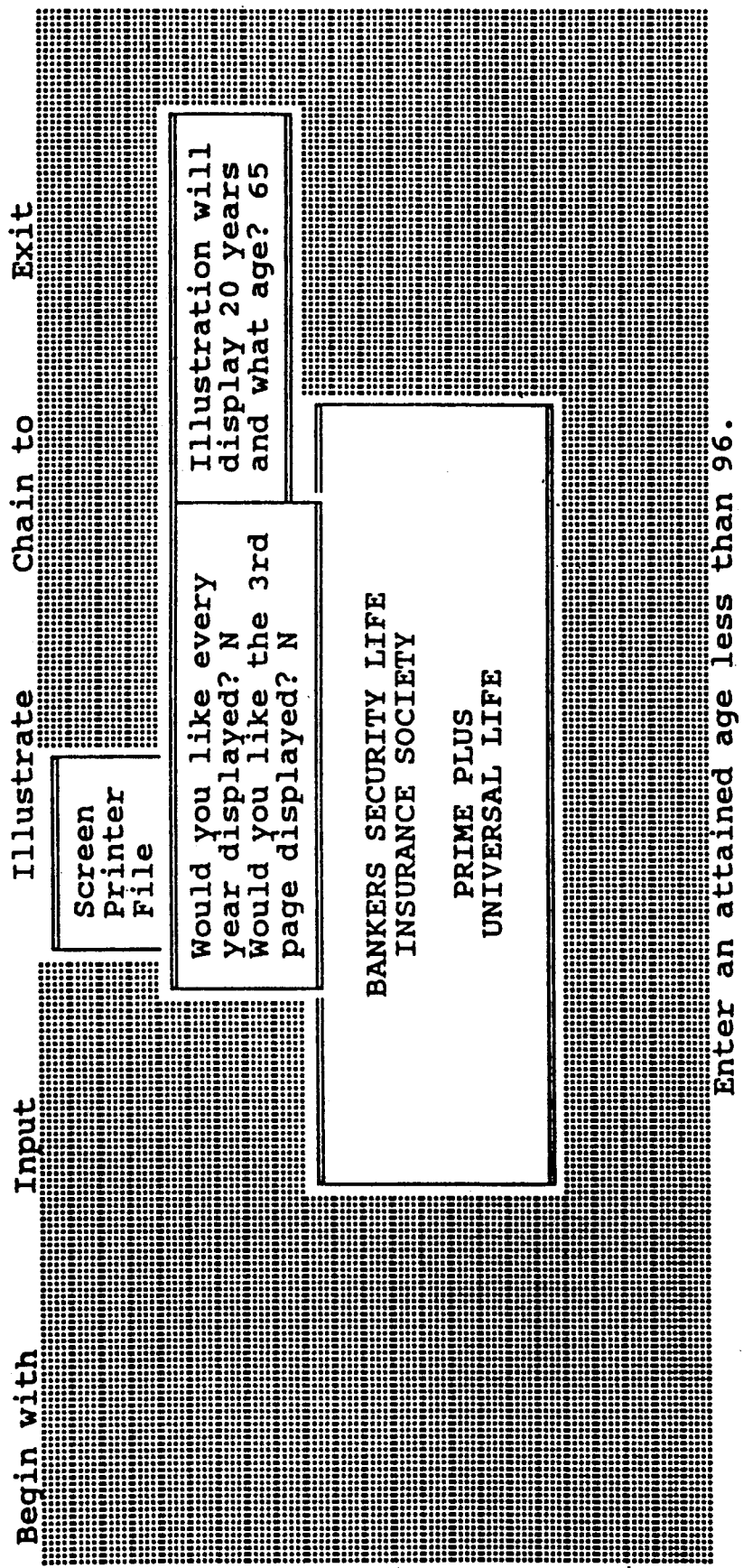
Figure 9N:
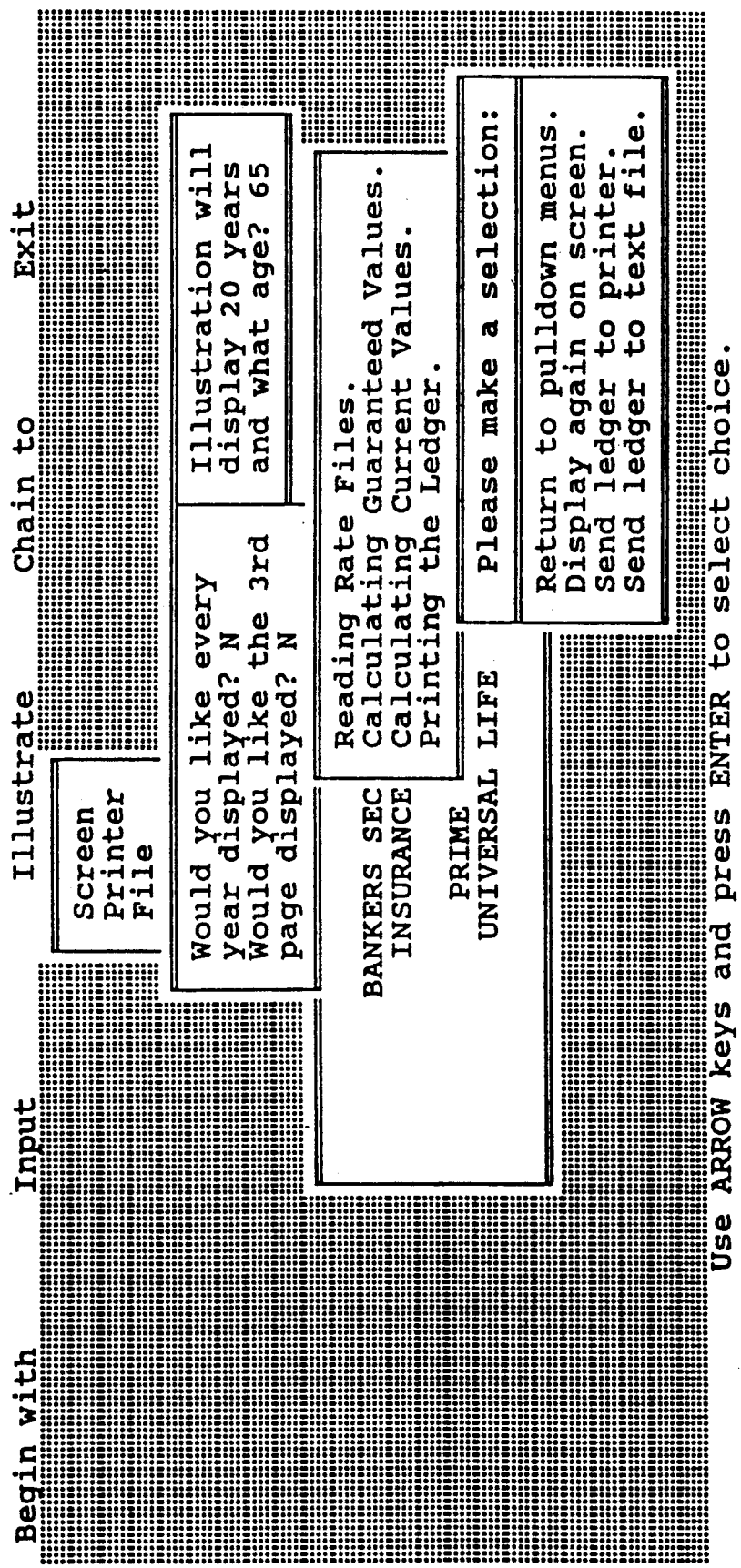
Figure 90:
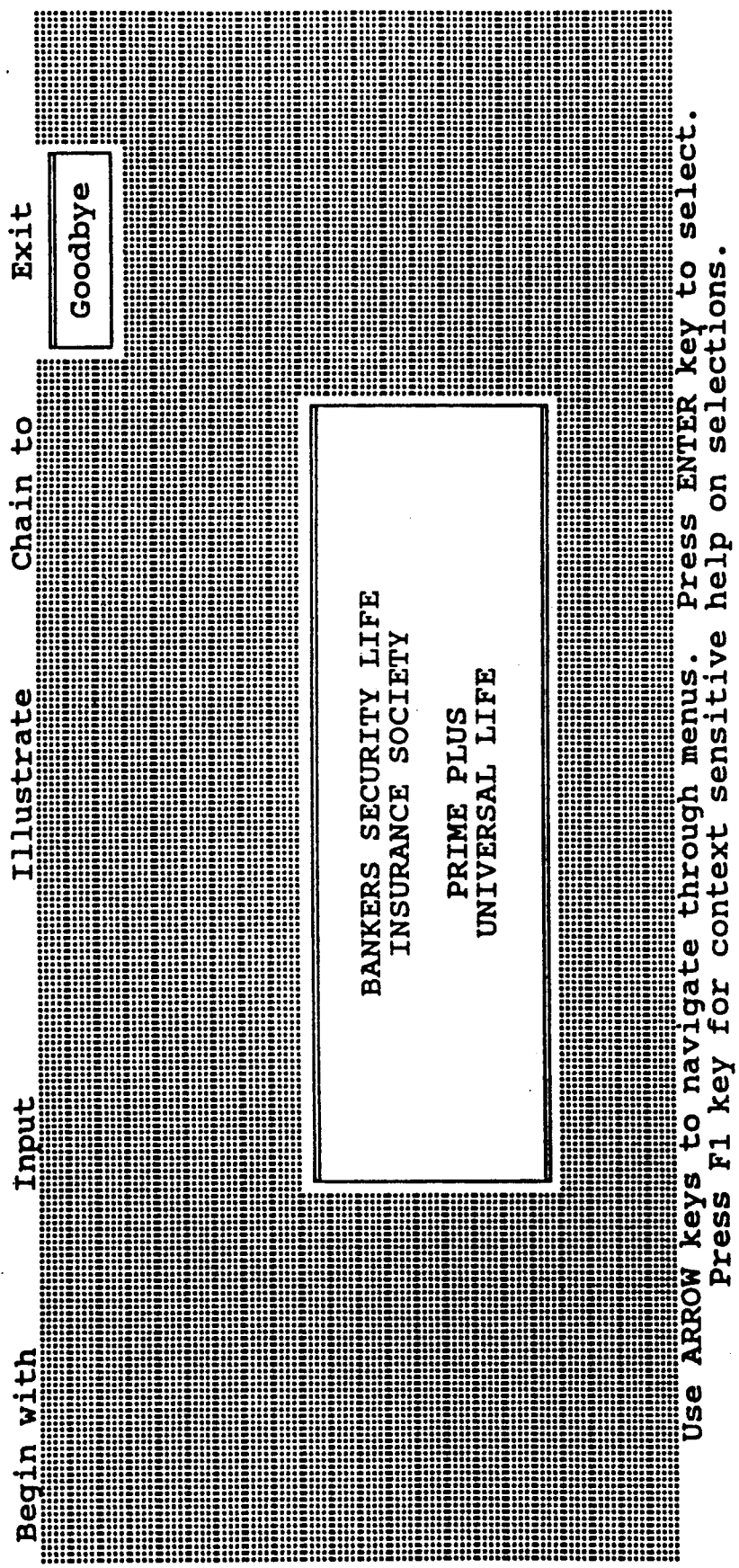

By way of example, the process of printing out the product proposal screens is illustrated in FIGS. 9K through 9N. The representative selects the printer option within the previous illustrated option as illustrated in FIG. 9K. The representative can select the product proposal screens to be displayed by answering the appropriate queries on the menu displayed on display 24. As a result of selection of the display options, FIGS. 9L and 9M are printed on printer 28. Once these have been printed, FIG. 9N is displayed permitting the representative to either reprint the product proposal screens, change the screens to be printed, or return to the menus allowing entry of different product proposal data. This is accomplished by selecting the return to pull down menus option illustrated in FIG. 9N. Based upon a verbal determination at 164 that the customer does not desire to use different product proposal data, but desires to exit the product proposal routine, the representative scrolls across the main Bankers Prime Plus Universal Life Insurance screen to the Exit option as illustrated in FIG. 9O. Selection of the Exit option causes control to be returned to the calling routine as previously described, resulting in the representative asking the customer whether he or she desires an application/contract for the selected product having the selected options.

Figure 8:
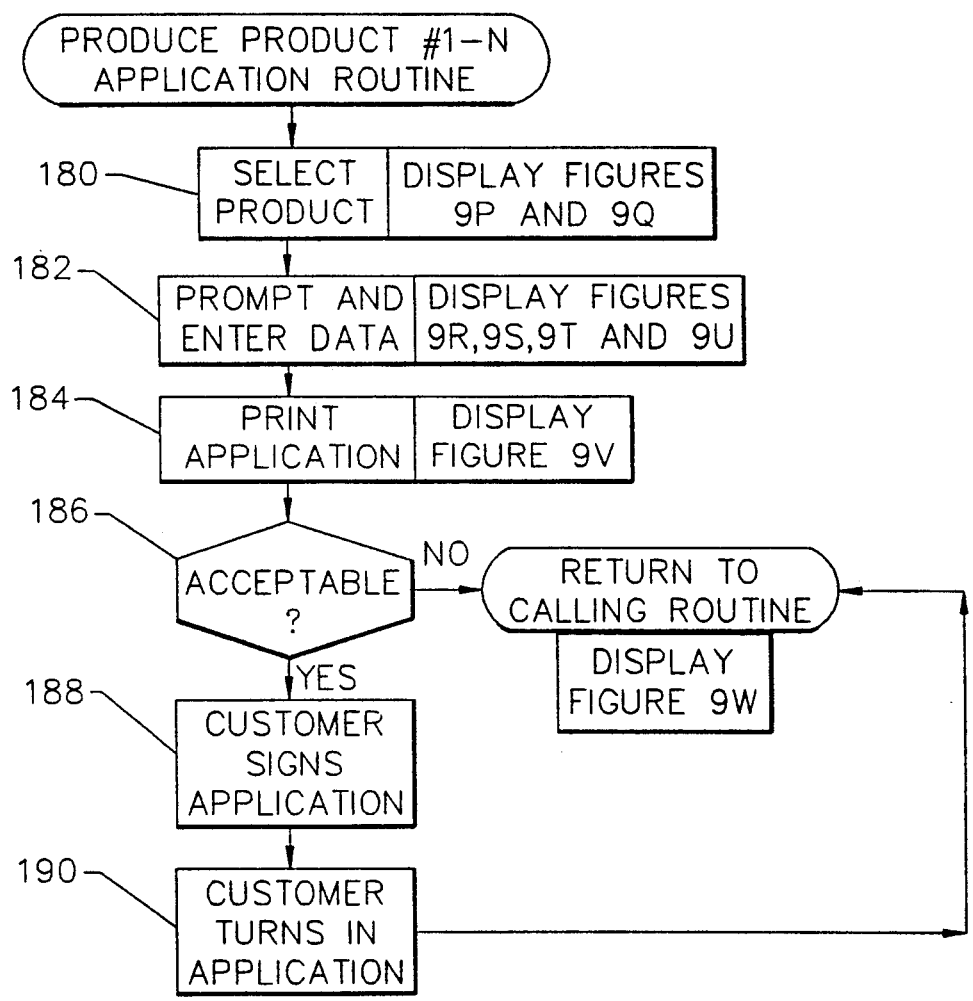

Referring to FIG. 8, the sequence of operations for producing a product application will now be described. As a result of a verbal determination at 136 of FIG. 6 that the customer was interested in obtaining an application for the selected product containing the options presented in the proposal, the operational flow of FIG. 8 begins. In this particular embodiment, the customer must again select a category of personal financial services as well as an individual product within the selected category. The category and product are selected at 180. Based upon an oral selection by the customer via telephone 30, the financial institution representative indicates the selection of the category and subsequently the product within the category via keyboard 46. An example of the display screens appearing on display 24 as well as display 44 are illustrated in FIGS. 9P and 9Q.

Once the category and the product within the category have been selected for obtaining an application/contract for the product, the personal customer data as well as the product option data must be entered (Block 182). As illustrated in FIG. 9R, the personal customer data which is sought is displayed on display 24 and display 44. The representative asks the customer for each piece of information. The representative enters the information provided by the customer via keyboard 46. As a result of the entry of the information, the information appears in the appropriate data field on both display 24 and display 44.

The displays illustrated in FIGS. 9S, 9T and 9U contain further information concerning personal characteristics of the customer as well as selection of product options which must be entered in order to produce the application/contract for the selected product having the selected options. Similar to the PRODUCT PROPOSAL ROUTINE, the screen displays will vary in number as well as content, depending on the selected category and selected product within the selected category.

Once all the personal customer information and product option information has been obtained and entered, the representative will cause the central processing unit 22 of the customer terminal to print the completed product application/contract containing the personal customer information and product option information on printer 28 of the customer terminal. The printed product application/contract is a computerized form for the selected product which is customized to contain the personal customer information as well as the option information for the selected product. This information is temporarily stored in the appropriate fields in order to print the product application at 184. An example of an application which may be printed on printer 28 of the customer terminal is illustrated in FIGS. 9V, 9W and 9X.

A determination is then made at this point by the customer as to whether the printed product application/contact is acceptable (Block 186). Based upon a determination at 186 that the printed application is not acceptable to the customer, the representative determines whether or not the customer desires to obtain information concerning another product (Block 138 of FIG. 6). The representative exits the PRODUCE PRODUCT APPLICATION ROUTINE. An example of the exit screen display is illustrated in FIG. 9Y.

Based upon a determination at 186 by the customer that the printed product application/contract is acceptable, the customer signs the application/contract at 188 and turns in the application at 190. Once the application/contract is turned in at 190, the representative determines whether the customer desires to obtain information concerning another product (Block 138 of FIG. 6). The representative exits the PRODUCE PRODUCT APPLICATION ROUTINE. An example of an exit screen display which the representative utilizes is illustrated in FIG. 9Y.

Alternatives to the customer signing the product application/contract and turning in the application at Blocks 188 and 190, respectively, permit the customer to take the application in order to study the selected product and options. The customer may then sign the application/contract at a later time and either mail the executed application/contract along with payment to the main office of the financial institution or hand deliver the executed application/contract with payment to either the branch office or main office of the financial institution.

If the customer signs the application and turns in the application, payment may also be made directly at the customer terminal. Payment is made using magnetic strip reader 32. The customer simply inserts a credit card into magnetic strip reader 32. The magnetic strip reader reads the customer's credit card information and charges the amount to the customer's credit card account. Magnetic strip reader 32 may also record personal customer information and product proposals on a customer card. The customer can later insert the customer card into magnetic strip reader 32 to read the personal customer information and possibly any previous product proposals recorded on the magnetic strip into central processing unit 22. It will also be understood by those skilled in the art that the personal customer information and the product option information obtained during the product proposal routine may be stored in the memory of the customer terminal. Therefore, this information need not be entered again during the PRODUCE PRODUCT APPLICATION ROUTINE, but rather may be simply recalled and inserted into the appropriate fields of the application/contract to be printed for the selected product.

As described, the present invention allows personal financial services to be provided from a central location, using a network of terminals, without losing the human interaction which is necessary for successful completion of a transaction and without requiring the customer to operate a computer.

In the drawings and specifications there have been disclosed typical preferred embodiments and, although specific terms are employed, they are used in a generic and descriptive sense only and not for purposes of limitation, the scope of the invention being set forth in the following claims.

That which is claimed:

1. A method for providing personal financial services over a network of customer terminals and representative terminals, comprising the steps of:
    accepting a telephone request at a representative terminal from a customer at a customer terminal; linking the representative terminal to the customer terminal for data communication therebetween;
    seizing control of the customer terminal by the representative terminal so that the representative terminal remotely controls operation of the customer terminal; and
    providing personal financial services to a customer at the customer terminal under control of the representative terminal using personal financial services information which is stored at the customer terminal;
    wherein said seizing control step comprises the step of causing an input device at the representative terminal to remotely control the retrieval of stored personal financial services information at the customer terminal and to display the retrieved personal financial services information at the customer terminal.

2. The method of claim 1 wherein said providing step comprises the step of displaying information concerning types of personal financial services available at the customer terminal.

3. The method of claim 2 wherein said providing step further comprises the step of displaying information concerning options for a selected type of personal financial service available at the customer terminal.

4. The method of claim 3 wherein said providing step further comprises the step of displaying an application form or contract for the selected type of personal financial service with the selected options.

5. The method of claim 4 wherein said providing step further comprises the step of printing the application form or contract.

* * * * *